United States Patent
Agiwal et al.

(10) Patent No.: US 11,140,717 B2
(45) Date of Patent: Oct. 5, 2021

(54) APPARATUS AND METHOD OF TRANSMITTING AND RECEIVING MESSAGE 3 PROTOCOL DATA UNIT

(71) Applicant: Samsung Electronics Co., Ltd., Suwon-si (KR)

(72) Inventors: Anil Agiwal, Suwon-si (KR); Soenghun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 25 days.

(21) Appl. No.: 16/399,038

(22) Filed: Apr. 30, 2019

(65) Prior Publication Data

US 2019/0335507 A1  Oct. 31, 2019

Related U.S. Application Data

(60) Provisional application No. 62/686,793, filed on Jun. 19, 2018, provisional application No. 62/664,378, filed on Apr. 30, 2018.

(51) Int. Cl.
*H04W 74/08* (2009.01)
*H04W 52/02* (2009.01)
(Continued)

(52) U.S. Cl.
CPC ..... *H04W 74/0833* (2013.01); *H04W 28/065* (2013.01); *H04W 48/16* (2013.01);
(Continued)

(58) Field of Classification Search
CPC ........... H04W 74/0833; H04W 72/046; H04W 36/0072; H04W 24/10; H04W 74/02;
(Continued)

(56) References Cited

U.S. PATENT DOCUMENTS

| 9,839,013 B2 | 12/2017 | Kim et al. |
| 10,397,828 B1 | 8/2019 | Ohta et al. |

(Continued)

FOREIGN PATENT DOCUMENTS

| WO | 2017/150863 A1 | 9/2017 | |
| WO | WO-2019082152 A1 * | 5/2019 | .......... H04W 74/006 |

OTHER PUBLICATIONS

U.S. Appl. No. 62/578,039, filed Oct. 2017, Peisa, Janne.*

(Continued)

*Primary Examiner* — Sai Aung
(74) *Attorney, Agent, or Firm* — Jefferson IP Law, LLP

(57) ABSTRACT

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a terminal for performing a random access procedure in a wireless communication system is provided. In addition, a method by a terminal for system information (SI) request is provided. A method includes receiving, from a base station, information on resources for SI request including information on a start index of at least one random access preamble for the SI request; receiving, from the base station, at least one synchronization signal block (SSB); selecting an SSB among the at least one SSB; determining a preamble for the SI request corresponding to the selected SSB based on the information on the start index; and transmitting, to the base station, the determined pre- (Continued)

amble based on a physical random access channel (PRACH) occasion corresponding to the selected SSB.

16 Claims, 17 Drawing Sheets

(51) Int. Cl.
 H04W 76/27 (2018.01)
 H04W 28/06 (2009.01)
 H04W 48/16 (2009.01)
 H04W 48/18 (2009.01)
 H04W 88/02 (2009.01)
 H04W 4/70 (2018.01)
 H04W 84/04 (2009.01)

(52) U.S. Cl.
 CPC ........... *H04W 48/18* (2013.01); *H04W 76/27* (2018.02); *H04W 4/70* (2018.02); *H04W 84/042* (2013.01); *H04W 88/02* (2013.01)

(58) Field of Classification Search
 CPC ........... H04W 36/0077; H04W 16/28; H04W 24/08; H04W 36/0061; H04W 36/30; H04W 48/06; H04W 48/10; H04B 7/0695; H04B 7/0617; H04B 7/0871; H04B 7/0626; H04B 7/0689; H04B 7/088
 See application file for complete search history.

(56) References Cited

U.S. PATENT DOCUMENTS

| | | | |
|---|---|---|---|
| 2009/0163211 A1 | 6/2009 | Kitazoe et al. | |
| 2013/0182672 A1 | 7/2013 | Kakishima et al. | |
| 2014/0079011 A1* | 3/2014 | Wiberg | H04W 74/006 370/329 |
| 2017/0127367 A1* | 5/2017 | Axnas | H04W 72/0446 |
| 2017/0195464 A1 | 7/2017 | Lee et al. | |
| 2018/0302929 A1 | 10/2018 | Takahashi et al. | |
| 2018/0343595 A1* | 11/2018 | da Silva | H04B 7/0695 |
| 2019/0044811 A1 | 2/2019 | Miao et al. | |
| 2019/0132855 A1 | 5/2019 | Lee et al. | |
| 2019/0132862 A1 | 5/2019 | Jeon et al. | |
| 2019/0149308 A1 | 5/2019 | Son | |
| 2019/0150183 A1 | 5/2019 | Aiba et al. | |
| 2019/0159261 A1 | 5/2019 | Jung et al. | |
| 2019/0166539 A1 | 5/2019 | Chen et al. | |
| 2019/0182716 A1 | 6/2019 | Futaki et al. | |
| 2019/0182870 A1 | 6/2019 | Shin et al. | |
| 2019/0208548 A1 | 7/2019 | Shin et al. | |
| 2019/0215869 A1 | 7/2019 | Lin | |
| 2019/0254114 A1 | 8/2019 | Son | |
| 2019/0289513 A1 | 9/2019 | Jeon et al. | |
| 2019/0296805 A1 | 9/2019 | Son | |
| 2019/0297529 A1 | 9/2019 | Hampel et al. | |
| 2019/0306842 A1 | 10/2019 | Cirik et al. | |
| 2019/0306867 A1 | 10/2019 | Cirik et al. | |
| 2019/0306890 A1 | 10/2019 | Jang et al. | |
| 2019/0313391 A1 | 10/2019 | Lin | |
| 2019/0313437 A1 | 10/2019 | Jung et al. | |
| 2019/0364602 A1 | 11/2019 | Yi et al. | |
| 2020/0052767 A1* | 2/2020 | Wang | H04B 7/0695 |
| 2020/0107235 A1* | 4/2020 | Peisa | H04B 7/0626 |
| 2020/0119800 A1* | 4/2020 | Rune | H04W 76/28 |
| 2020/0128455 A1* | 4/2020 | Da Silva | H04W 36/0072 |
| 2020/0245228 A1* | 7/2020 | Rune | H04B 7/0871 |

OTHER PUBLICATIONS

International Search Report and Written Opinion dated Aug. 6, 2019, issued in an International application No. PCT/KR2019/005236.
Ericsson, 'Msg3 size for CCCH payload', R2-1803202, 3GPP TSG-RAN WG2 #101, Section 2; and figures 1-2; Feb. 15, 2018, Athens, Greece.
Ericsson, 'Size of MSG3 in NR', R2-1802638, 3GPP TSG-RAN WG2 #101, Sections 2-3; Feb. 16, 2018, Athens, Greece.
U.S. Office Action dated May 18, 2020 from the U.S. Appl. No. 16/399,172.
U.S. Office Action dated Jul. 20, 2020 from the U.S. Appl. No. 16/398,877.
Extended European Search Report dated Mar. 10, 2021, issued in a counterpart European Application No. 19795892.9-1215/3756405.
U.S. Office Action dated May 4, 2021, issued by the U.S. Appl. No. 16/398,877.
Ericsson: "Msg3 size for CCCH payload", 3GPP Draft; R2-1805415-MSG3 Size for CCCH Payload, 3rd Generation Partnership Project (3GPP), Mobile Competence Centre ; 650, Route Des Lucioles ; F-06921 Sophia-Antipolis Cedex ; France, vol. RAN WG2, No. XP051429078; Apr. 14, 2018, Sanya, P.R. of China.
LG: "Data Volume Indicator for NB-IOT", 3GPP Draft; R2-162900 Data Volume Indicator for NB-IOT, 3rd Generation Partnership Project (3GPP), Mobile Competence Centre ; 650, Route Des Lucioles ; F-06921 Sophia-Antipolis Cedex ; France, vol. RAN WG2, No. XP051082630; Apr. 2, 2016, St. Julian's, Malta.

* cited by examiner

FIG. 5

FIG. 13

| SSB 3 | P4 |
| SSB 2 | P3 |
| SSB 1 | P2 |
| SSB 0 | P1 |
RO #1

| SSB 7 | P4 |
| SSB 6 | P3 |
| SSB 5 | P2 |
| SSB 4 | P1 |
RO #2

| SSB 11 | P4 |
| SSB 10 | P3 |
| SSB 9 | P2 |
| SSB 8 | P1 |
RO #3

| SSB 15 | P4 |
| SSB 14 | P3 |
| SSB 13 | P2 |
| SSB 12 | P1 |
RO #4

APPARATUS AND METHOD OF TRANSMITTING AND RECEIVING MESSAGE 3 PROTOCOL DATA UNIT

CROSS-REFERENCE TO RELATED APPLICATION(S)

This application is based on and claims priority under 35 U.S.C. § 119(e) of a U.S. Provisional application Ser. No. 62/664,378, filed on Apr. 30, 2018 in the U.S. Patent and Trademark Office, and of a U.S. Provisional application Ser. No. 62/686,793, filed on Jun. 19, 2018, in the U.S. Patent and Trademark Office, the disclosure of which is incorporated by reference herein its entirety.

BACKGROUND

1. Field

The disclosure relates to a system and a method of transmitting and receiving message 3 protocol data unit (PDU).

2. Description of Related Art

To meet the demand for wireless data traffic having increased since deployment of fourth generation (4G) communication systems, efforts have been made to develop an improved fifth generation (5G) or pre-5G communication system. Therefore, the 5G or pre-5G communication system is also called a 'beyond 4G network' or a 'post long term evolution (LTE) System'. The 5G wireless communication system is considered to be implemented not only in lower frequency bands but also in higher frequency (mmWave) bands, e.g., 10 GHz to 100 GHz bands, so as to accomplish higher data rates. To mitigate propagation loss of the radio waves and increase the transmission (TX) distance, the beamforming, massive multiple-input multiple-output (MIMO), full dimensional MIMO (FD-MIMO), array antenna, an analog beam forming, and large scale antenna techniques are being considered in the design of the 5G wireless communication system. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like. In the 5G system, hybrid frequency shift keying (FSK) and quadrature amplitude modulation (QAM), frequency QAM (FQAM) and sliding window superposition coding (SWSC) as an advanced coding modulation (ACM), filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the internet of things (IoT) where distributed entities, such as things, exchange and process information without human intervention. The internet of everything (IoE), which is a combination of the IoT technology and the big data processing technology through connection with a cloud server, has emerged. As technology elements, such as "sensing technology", "wired/wireless communication and network infrastructure", "service interface technology", and "Security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies, such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

In the recent years several broadband wireless technologies have been developed to meet the growing number of broadband subscribers and to provide more and better applications and services. The second generation (2G) wireless communication system has been developed to provide voice services while ensuring the mobility of users. Third generation (3G) wireless communication system supports not only the voice service but also data service. The 4G wireless communication system has been developed to provide high-speed data service. However, the 4G wireless communication system currently suffers from lack of resources to meet the growing demand for high speed data services. Therefore, the 5G wireless communication system is being developed to meet the growing demand of various with diverse requirements, e.g. high speed data services, support ultra-reliability and low latency applications.

In addition, the 5G wireless communication system is expected to address different use cases having quite different requirements in terms of data rate, latency, reliability, mobility etc. However, it is expected that the design of the air-interface of the 5G wireless communication system would be flexible enough to serve the user equipments (UEs) having quite different capabilities depending on the use case and market segment the UE cater service to the end customer. Example use cases the 5G wireless communication system wireless system is expected to address is enhanced mobile broadband (eMBB), massive machine type communication (m-MTC), ultra-reliable low latency communication (URLL) etc. The eMBB requirements like tens of Gbps data rate, low latency, high mobility so on and so forth address the market segment representing the conventional wireless broadband subscribers needing internet connectivity everywhere, all the time and on the go. The m-MTC requirements like very high connection density, infrequent data transmission, very long battery life, low mobility address so on and so forth address the market segment representing the IoT/IoE envisioning connectivity of billions of devices. The URLL requirements like very low latency, very high reliability and variable mobility so on and so forth address the market segment representing the industrial automation application, vehicle-to-vehicle/vehicle-to-infrastructure communication foreseen as one of the enabler for autonomous cars.

In the 5G (also referred as next generation radio or new radio (NR)) wireless communication system, random access (RA) procedure is used to achieve uplink time synchronization. RA procedure is used during initial access, handover, radio resource control (RRC) connection re-establishment procedure, scheduling request transmission, secondary cell group (SCG) addition/modification, beam failure recovery and data or control information transmission in uplink by non-synchronized UE in RRC CONNECTED state.

FIG. 1 shows a contention based RA procedure which comprises of 4 operations according to the related art. RA preamble (or Msg1) transmission (operation 110): UE selects one of the available contention based RA preambles. The contention based RA preambles can be optionally partitioned into two groups (group A and group B). If two groups are configured and if the potential Msg3 size (UL data available for transmission plus MAC header and, where required, media access control (MAC) control elements (CEs)) is greater than ra-Msg3SizeGroupA and the pathloss is less than PCMAX (of the serving cell performing the RA procedure)—preambleReceivedTargetPower—deltaPreambleMsg3—messagePowerOffsetGroupB, UE select the RA preambles group B. Otherwise UE select the RA preambles group A. PreambleReceivedTargetPower, messagePowerOffsetGroupB and ra-Msg3SizeGroupA are configured by network (e.g. gNB).

RA response (RAR) or Msg2 (operation 120): gNB transmits the RAR on physical downlink shared channel (PDSCH) addressed to RA-radio network temporary identifier (RNTI). RA-RNTI identifies the time-frequency resource in which RA preamble was detected by gNB. RAR conveys RA preamble identifier, timing alignment information, temporary cell-RNTI (C-RNTI) and uplink (UL) grant for Msg 3.

Scheduled UL transmission on UL shared channel (SCH) (or Msg3) (operation 130): It is used to transmit message such as RRC connection request, RRC connection re-establishment request, RRC handover confirm, scheduling request, etc. It also includes the UE identity (i.e. C-RNTI or system architecture evolution (SAE)-temporary mobile subscriber identity (S-TMSI) or a random number). Hybrid automatic repeat request (HARQ) is used for this transmission. This is commonly referred as Msg3.

Contention resolution message (operation 140): It uses HARQ and is addressed to C-RNTI (if included in Msg 3) or temporary C-RNTI (UE identity included in Msg3 is included this case). On successful decoding of this message, HARQ feedback is only sent by UE which detects its own UE ID (or C-RNTI).

In NR the size of Msg3 for RRC connection request is 64 bits (structure of message: 3 bits; UE identity: 41 bits; Establishment Cause: 4 bits; MAC header: 2 bytes). The size of Msg3 is 1 byte more than LTE and hence leads to reduced UL coverage. Similarly the size of Msg3 for RRC establishment request also requires 64 bits in NR and should be reduced to 56 bits. The size of Msg3 for RRC connection resume requires 80 bits and should be reduced to 72 bits.

A method to reduce the size of Msg3 is needed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a communication method and system for converging a fifth generation (5G) communication system for supporting higher data rates beyond a fourth generation (4G) system.

Additional aspects will be set forth in part in the description which follows and, in part, will be apparent from the description, or may be learned by practice of the presented embodiments.

In new radio (NR) the size of Msg3 for radio resource control (RRC) connection request is 64 bits (structure of message: 3 bits; user equipment (UE) identity: 41 bits; Establishment Cause: 4 bits; media access control (MAC) header: 2 bytes). The size of Msg3 is 1 byte more than long term evolution (LTE) and hence leads to reduced uplink (UL) coverage. Similarly the size of Msg3 for RRC establishment request also requires 64 bits in NR and should be reduced to 56 bits. The size of Msg3 for RRC connection resume requires 80 bits and should be reduced to 72 bits.

In accordance with an aspect of the disclosure, a method of a terminal for performing a random access procedure in a wireless communication system is provided. The method includes identifying whether physical random access channel (PRACH) occasions are configured for an active uplink (UL) bandwidth part (BWP) of a serving cell; based on the PRACH occasions not being configured for the active UL BWP and the serving cell being a special cell (SpCell), switching an active downlink (DL) BWP of the SpCell; and performing the random access procedure on the active DL BWP of the SpCell and the active UL BWP of the serving cell.

In accordance with an aspect of the disclosure, a terminal in a wireless communication system is provided. The terminal includes a transceiver; and at least one processor coupled with the transceiver and configured to identify whether physical random access channel (PRACH) occasions are configured for an active uplink (UL) bandwidth part (BWP) of a serving cell, based on the PRACH occasions not being configured for the active UL BWP and the serving cell being a special cell (SpCell), switch an active downlink (DL) BWP of the SpCell, and perform the random access procedure on the active DL BWP of the SpCell and the active UL BWP of the serving cell.

In accordance with an aspect of the disclosure, a method by a terminal for transmitting a message 3 (Msg3) in a random access procedure is provided. The method includes determining that a media access control (MAC) service data unit (SDU) is associated with a common control channel (CCCH); identifying a size of the MAC SDU; determining a logical channel identifier (LCID) field of a MAC subheader based on the size of the MAC SDU; generating a MAC packet data unit (PDU) including the MAC subheader and the MAC SDU; and transmitting, to a base station, the Msg3 associated with the MAC PDU.

In accordance with an aspect of the disclosure, a method by a base station for receiving a message 3 (Msg3) in a random access procedure is provided. The method includes receiving, from a terminal, the Msg3 associated with a media access control (MAC) packet data unit (PDU) including a MAC subheader and a MAC service data unit (SDU) associated with a common control channel (CCCH); and identifying a size of the MAC SDU based on a logical channel identifier (LCID) field of the MAC subheader.

In accordance with an aspect of the disclosure, a terminal in a wireless communication system is provided. The terminal includes a transceiver; and at least one processor coupled with the transceiver and configured to determine that a media access control (MAC) service data unit (SDU) is associated with a common control channel (CCCH), identify a size of the MAC SDU, determine a logical channel identifier (LCID) field of a MAC subheader based on the size of the MAC SDU, generate a MAC packet data unit (PDU) including the MAC subheader and the MAC SDU, and control the transceiver to transmit, to a base station, a Msg3 associated with the MAC PDU.

In accordance with an aspect of the disclosure, a base station in a wireless communication system is provided. The base station includes a transceiver; and at least one processor coupled with the transceiver and configured to control the transceiver to receive, from a terminal, a Msg3 associated with a media access control (MAC) packet data unit (PDU) including a MAC subheader and a MAC service data unit (SDU) associated with a common control channel (CCCH), and identify a size of the MAC SDU based on a logical channel identifier (LCID) field of the MAC subheader.

In accordance with an aspect of the disclosure, a method by a terminal for system information (SI) request is provided. The method includes receiving, from a base station, information on resources for SI request including information on a start index of at least one random access preamble for the SI request; receiving, from the base station, at least one synchronization signal block (SSB); selecting an SSB among the at least one SSB; determining a preamble for the SI request corresponding to the selected SSB based on the information on the start index; and transmitting, to the base station, the determined preamble based on a physical random access channel (PRACH) occasion corresponding to the selected SSB.

In accordance with an aspect of the disclosure, a terminal in a wireless communication system is provided. The terminal includes a transceiver; and at least one processor coupled with the transceiver and configured to control the transceiver to receive, from a base station, information on resources for system information (SI) request including information on a start index of at least one random access preamble for the SI request, control the transceiver to receive, from the base station, at least one synchronization signal block (SSB), select an SSB among the at least one SSB, determine a preamble for the SI request corresponding to the selected SSB based on the information on the start index, and control the transceiver to transmit, to the base station, the determined preamble based on a physical random access channel (PRACH) occasion corresponding to the selected SSB.

The embodiments of the disclosure enable reduction of Msg3 size for all types of RRC messages.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 illustrates 1 byte R/LCID MAC subheader according to an embodiment of the disclosure;

FIG. 13 is an example illustration of mapping preambles in ra-PreambleIndexList to synchronization signal (SS) blocks (SSBs) according to an embodiment of the disclosure;

Throughout the drawings, like reference numerals will be understood to refer to like parts, components, and structures.

DETAILED DESCRIPTION

Figure 1:
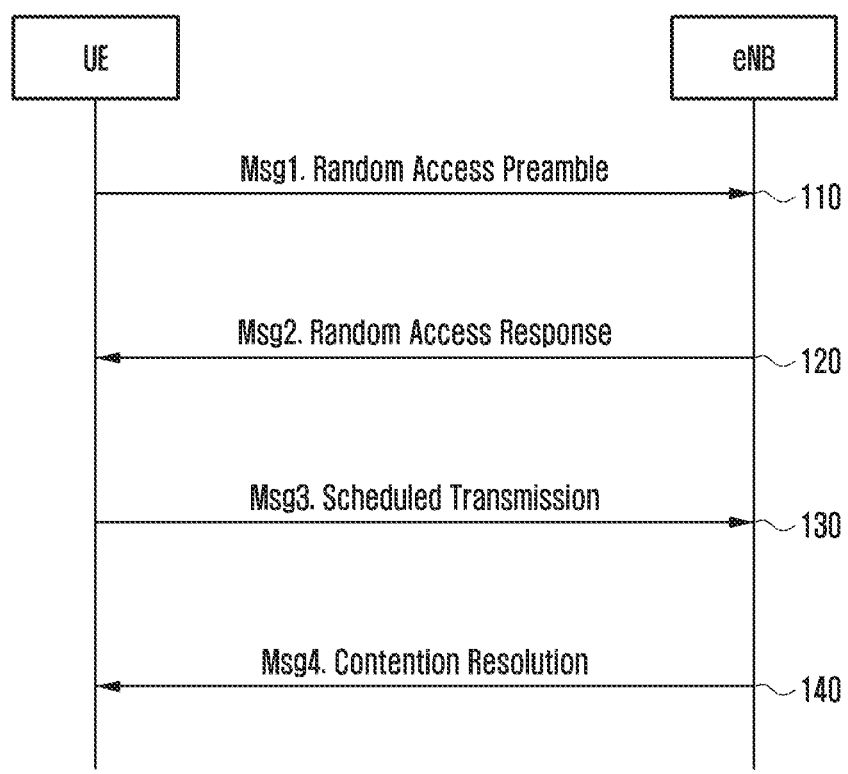
FIG. 1 shows a contention based random access (RA) procedure which comprises of 4 operation according to the related art.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

It is known to those skilled in the art that blocks of a flowchart (or sequence diagram) and a combination of flowcharts may be represented and executed by computer program instructions. These computer program instructions may be loaded on a processor of a general purpose computer, special purpose computer, or programmable data processing equipment. When the loaded program instructions are executed by the processor, they create a means for carrying out functions described in the flowchart. Because the computer program instructions may be stored in a computer readable memory that is usable in a specialized computer or a programmable data processing equipment, it is also possible to create articles of manufacture that carry out functions described in the flowchart. Because the computer program instructions may be loaded on a computer or a programmable data processing equipment, when executed as processes, they may carry out operations of functions described in the flowchart.

A block of a flowchart may correspond to a module, a segment, or a code containing one or more executable instructions implementing one or more logical functions, or may correspond to a part thereof. In some cases, functions described by blocks may be executed in an order different from the listed order. For example, two blocks listed in sequence may be executed at the same time or executed in reverse order.

In this description, the words "unit", "module" or the like may refer to a software component or hardware component, such as, for example, a field-programmable gate array (FPGA) or an application-specific integrated circuit (ASIC) capable of carrying out a function or an operation. However, a "unit", or the like, is not limited to hardware or software. A unit, or the like, may be configured so as to reside in an addressable storage medium or to drive one or more processors. Units, or the like, may refer to software components, object-oriented software components, class components, task components, processes, functions, attributes, procedures, subroutines, program code segments, drivers, firmware, microcode, circuits, data, databases, data structures, tables, arrays or variables. A function provided by a component and unit may be a combination of smaller components and units, and may be combined with others to compose larger components and units. Components and units may be configured to drive a device or one or more processors in a secure multimedia card.

Prior to the detailed description, terms or definitions necessary to understand the disclosure are described. However, these terms should be construed in a non-limiting way.

The "base station (BS)" is an entity communicating with a user equipment (UE) and may be referred to as BS, base transceiver station (BTS), node B (NB), evolved NB (eNB), access point (AP), fifth generation (5G) NB (5GNB), or next generation NB (gNB).

The "UE" is an entity communicating with a BS and may be referred to as UE, device, mobile station (MS), mobile equipment (ME), or terminal.

Msg3 Size Reduction

Embodiment 1

In new radio (NR), a 2 byte or 3 byte media access control (MAC) subheader is added before each MAC service data unit (SDU). The MAC subheader comprises of R, F, logical channel ID (LCID) and L fields.

LCID: The LCID field identifies the logical channel instance of the corresponding MAC SDU. The LCID field size is 6 bits;

L: The Length field indicates the length of the corresponding MAC SDU. The size of the L field is indicated by the F field;

F: The Format field indicates the size of the Length field. The size of the F field is 1 bit. The value 0 indicates 8 bits of the Length field. The value 1 indicates 16 bits of the Length field;

In one embodiment of the disclosure 1 byte MAC subheader is used for MAC SDU if the MAC SDU is a common control channel (CCCH) SDU. Otherwise 2 byte or 3 byte MAC subheader is used for a MAC SDU. The CCCH SDU can be of multiple sizes (expressed in bits) and 1 byte MAC subheader is used for CCCH SDU irrespective of size of CCCH SDU. In one embodiment there can be two sizes (size X and size Y) of CCCH SDU. CCCH SDU of size X and size Y can also be referred as CCCH and CCCH1 SDU respectively. In the description term CCCH is commonly used for both CCCH and CCCH1.

Figure 2:
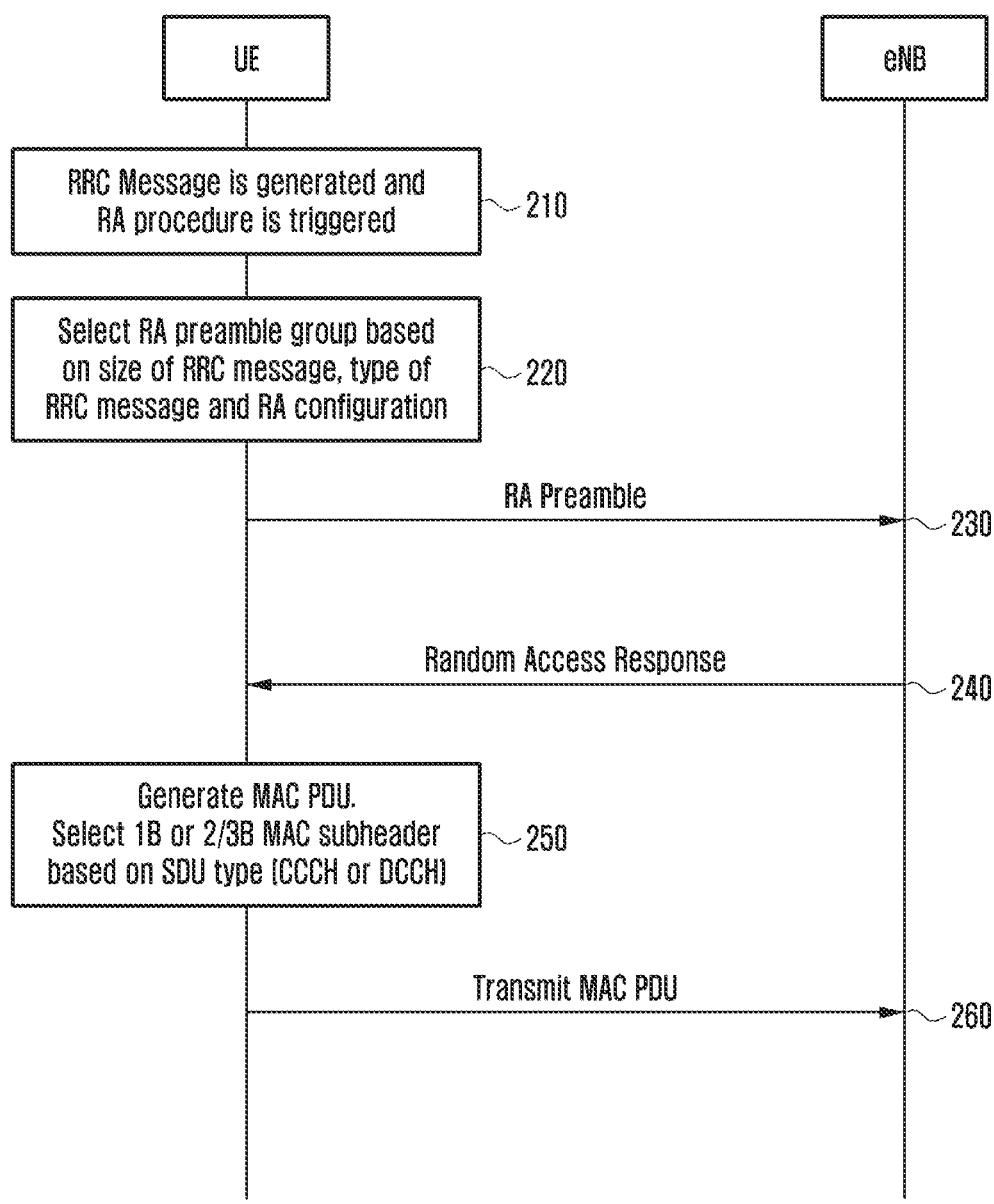
FIG. 2 shows the operations according to an embodiment of the disclosure.

FIG. 2 shows the operations according to an embodiment of the disclosure.

1. Radio resource control (RRC) message is generated and random access (RA) procedure is triggered by UE at operation 210.

2. UE selects RA preamble group based on the information indicated in the RA configuration (signaled in system information or in dedicated signaling) and considering the size of RRC message, type of RRC message and the corresponding MAC subheader at operation 220. The detail operation of RA preamble group selection is as follows:

If random access (RA) preambles group B is configured (i.e. groupBconfigured information element (IE) is included in RA configuration) and the RRC message is a dedicated control channel (DCCH) message and size of RRC message plus the corresponding MAC subheader (2B or 3B) is greater than messageSizeGroupA and the pathloss is less than PCMAX (of the serving cell performing the RA procedure)—preambleReceivedTargetPower—deltaPreambleMsg3—messagePowerOffsetGroupB: select Random Access Preamble group B; messageSizeGroupA, preambleReceivedTargetPower, and messagePowerOffsetGroupB are configured in RA configuration. deltaPreambleMsg3 is predefined for each physical random access channel (PRACH) format.

else if Random Access Preambles group B is configured (i.e. groupBconfigured IE is included in RA configuration) and the RRC message is CCCH message and size of RRC message plus the corresponding MAC sub-header (1B) is greater than messageSizeGroupA: select Random Access Preamble group B;

else select Random Access Preamble group A.

3. UE selects an RA preamble from the selected Random Access Preamble group and transmits Msg1, i.e. RA preamble at operation 230.

4. UE receives a random access response (RAR) corresponding to its transmitted RA preamble at operation 240. RAR includes UL grant.

5. UE generates MAC PDU by concatenating MAC sub-header and RRC message (or MAC SDU) at operation 250. If RRC message is CCCH SDU, 1 byte R/R/LCID MAC subheader is applied. If RRC message is DCCH SDU, 2 byte or 3 byte R/F/LCID/L MAC subheader is applied depending on size of DCCH SDU.

Figure 3:
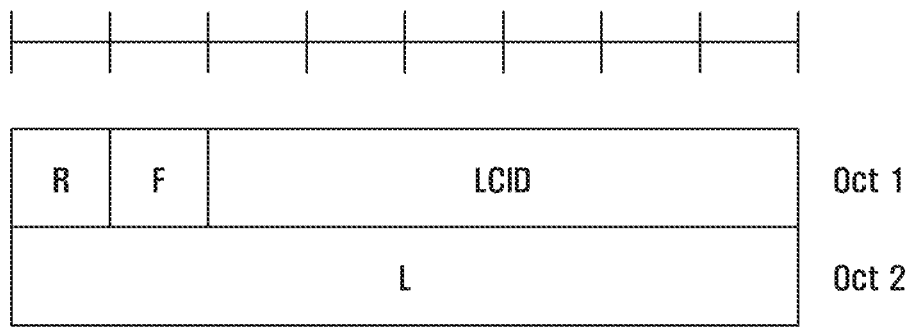
FIG. 3 illustrates 2 byte R/F/logical channel identifier (LCID)/L media access control (MAC) subheader according to an embodiment of the disclosure.

FIG. 3 illustrates 2 byte R/F/LCID/L MAC subheader according to an embodiment of the disclosure.

Figure 4:
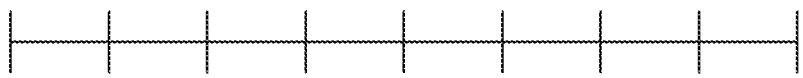
FIG. 4 illustrates 3 byte R/F/LCID/L MAC subheader according to an embodiment of the disclosure.

FIG. 4 illustrates 3 byte R/F/LCID/L MAC subheader according to an embodiment of the disclosure.

FIG. 5 illustrates 1 byte R/LCID MAC subheader according to an embodiment of the disclosure.

Figure 6:
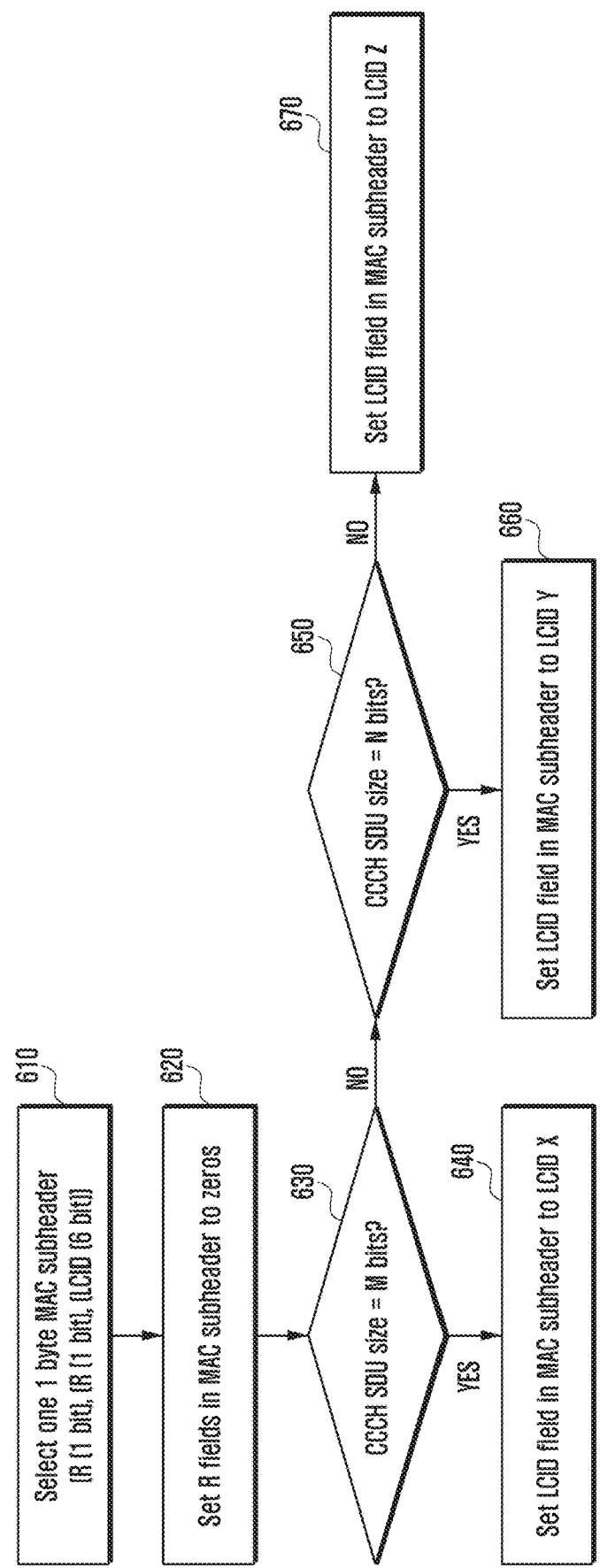
FIG. 6 shows the user equipment (UE) operations according to an embodiment of the disclosure.

A. FIG. 6 shows the UE operations according to an embodiment of the disclosure.

Referring to FIG. 6, UE selects one 1 byte MAC subheader at operation 610.

Referring to FIG. 5, the 1 byte MAC subheader may include two 1 bit R field and 6 bits LCID field. The UE sets R fields in the MAC subheader to zeros at operation 620. In this embodiment, the UE sets the LCID field in the MAC header based on the size of CCCH SDU. Specifically, the UE identifies whether the size of CCCH SDU is M bits at operation 630. The UE sets the LCID field in the MAC subheader to a pre-defined LCID X, if the size of CCCH SDU is M bits, at operation 640. Otherwise, the UE identifies whether the size of CCCH SDU is N bits at operation 650. The UE sets the LCID field in the MAC subheader to a pre-defined LCID Y, if the size of CCCH SDU is N bits, at operation 660. The UE sets the LCID field in the MAC subheader to a pre-defined LCID Z, if the size of CCCH SDU is other than M and N bits, at operation 670. The values of M and N are pre-defined in the system. In an example, M can be 48 bits and N can be 64 bits.

In an embodiment, a UE determines whether a MAC SDU is associated with a CCCH or a DCCH. If the MAC SDU corresponds to a CCCH SDU, the UE identifies the size of the MAC SDU to determine a LCID field of MAC subheader. The UE generates a MAC PDU including the MAC subheader and the MAC SDU, and transmits a Msg 3 associated with the generated MAC PDU to the gNB.

Figure 7:
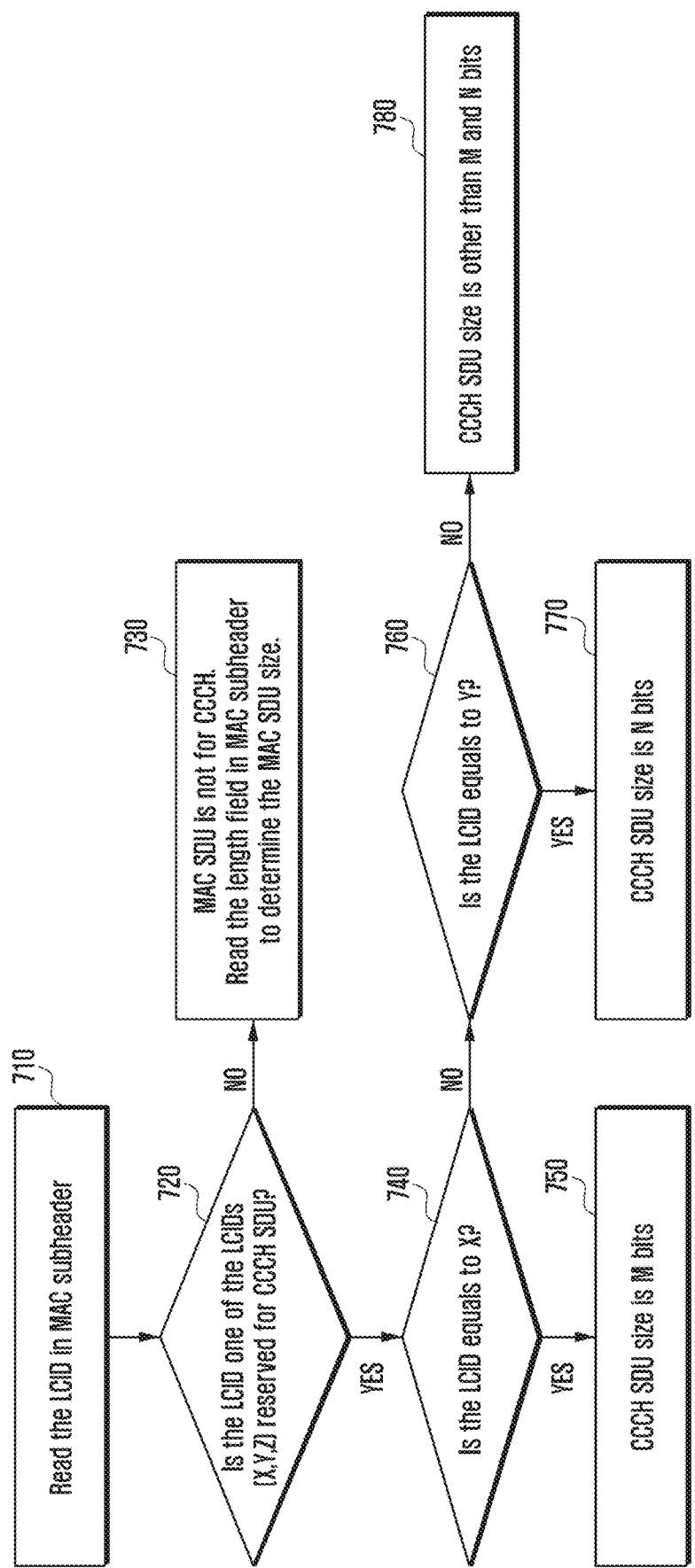
FIG. 7 shows the next generation node B (gNB) operations according to an embodiment of the disclosure.

FIG. 7 shows the gNB operations according to an embodiment of the disclosure.

Referring to FIG. 7, gNB reads the LCID in MAC subheader at operation 710. The gNB identifies whether the LCID is one of the LCIDs (X, Y, Z) reserved for CCCH SDU at operation 720. Based on the value of LCID in the MAC subheader of MAC subPDU, the gNB can know that MAC SDU in MAC subPDU is for CCCH or not. If the MAC SDU is not for CCCH, the gNB reads the Length field in the MAC subheader to determine the MAC SDU size at operation 730. If the MAC subPDU is for CCCH, the gNB can know the length of MAC SDU based on LCID value. Specifically, the gNB identifies whether the LCID is equals to X at operation 740. If the LCID is equals to X, the gNB determines that the CCCH SDU size is M bits at operation 750. If the LCID is not equals to X, the gNB identifies whether the LCID is equals to Y at operation 760. If the LCID is equals to Y, the gNB determines that the CCCH SDU size is N bits at operation 770. If the LCID is not equals to X and Y, the gNB determines that the CCCH SDU size is other than M and N bits at operation 780.

In an embodiment, the gNB receives a Msg3 associated with a MAC PDU including a MAC subheader and a MAC SDU from a UE. The LCID in MAC subheader may indicate that the MAC SDU is associated with a CCCH. If the received MAC SDU is a CCCH SDU, the gNB identifies the size of the MAC SDU based on a LCID field of the MAC subheader.

Figure 8:
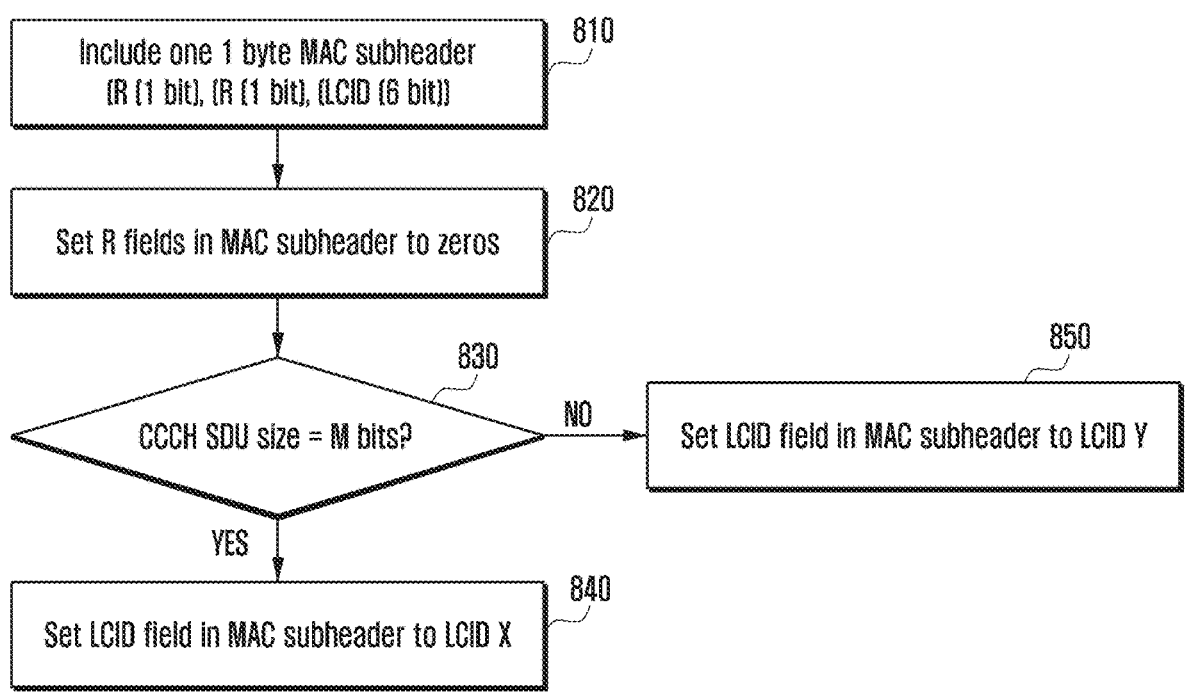
FIG. 8 shows the UE operations according to an embodiment of the disclosure.

B. FIG. 8 shows the UE operations according to an embodiment of the disclosure.

Referring to FIG. 8, UE includes one 1 byte MAC subheader at operation 810. As shown in FIG. 5, the 1 byte MAC subheader may include two 1 bit R field and 6 bits LCID field. The UE sets R fields in the MAC subheader to zeros at operation 820. In this embodiment, the UE sets the LCID field in the MAC header based on the size of CCCH SDU. Specifically, the UE identifies whether the size of CCCH SDU is M bits at operation 830. The UE sets the LCID field in the MAC subheader to a pre-defined LCID X, if the size of CCCH SDU is M bits, at operation 840. The UE sets the LCID field in the MAC subheader to a pre-defined LCID Y, if the size of CCCH SDU is N bits, at operation 850. The values of M and N are pre-defined in the system. In an example, M can be 48 bits and N can be 64 bits. CCCH SDU of size M bits and size N bits can also be referred as CCCH SDU and CCCH1 SDU respectively.

Figure 9:
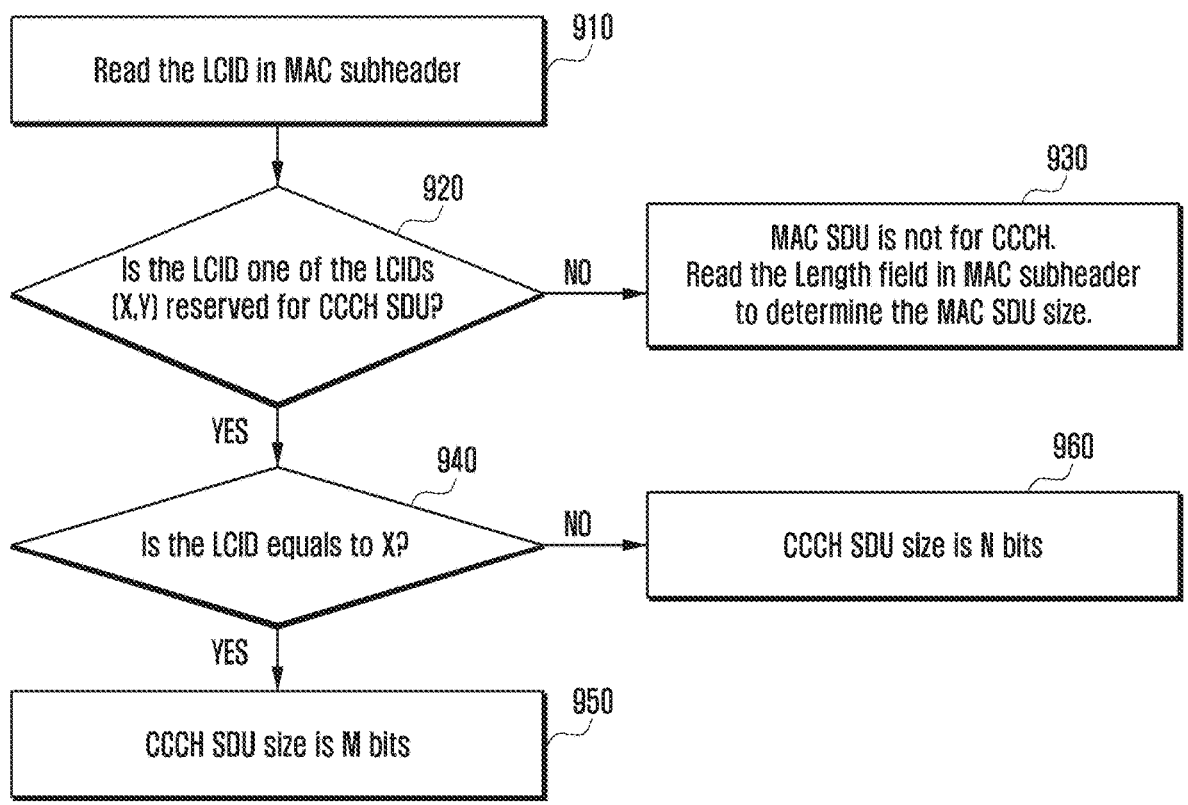
FIG. 9 shows the gNB operations according to an embodiment of the disclosure.

FIG. 9 shows the gNB operations according to another embodiment of the disclosure.

Referring to FIG. 9, gNB reads the LCID in MAC subheader at operation 910. The gNB identifies whether the LCID is one of the LCIDs (X, Y) reserved for CCCH SDU at operation 920. Based on the value of LCID in the MAC subheader of MAC subPDU, the gNB can know that MAC SDU in MAC subPDU is for CCCH or not. If the MAC SDU is not for CCCH LCID corresponds to dedicated control or traffic channel, the MAC subheader is a 2B or 3B MAC subheader and the gNB reads the Length field in the MAC subheader to determine the MAC SDU size at operation 930. If the MAC subPDU is for CCCH the gNB can know the length of MAC SDU based on LCID value. Specifically, the gNB identifies whether the LCID is equals to X at operation 940. If the LCID is equals to X, the gNB determines that the CCCH SDU size is M bits at operation 950. If the LCID is not equals to X, i.e., the LCID is equals to Y, the gNB determines that the CCCH SDU size is N bits at operation 960.

C. FIG. 8, UE sets the LCID field in the MAC subheader to a pre-defined LCID X, if the size of CCCH SDU is M bits, at operation 840. UE sets the LCID field in the MAC subheader to a pre-defined LCID Y, if the size of CCCH SDU is other than M bits, at operation 850. The value of M is pre-defined in the system. In an example, M can be 48 bits. Based on the value of LCID in MAC subheader of MAC subPDU, gNB can know that MAC SDU in MAC subPDU is for CCCH or not. If the MAC subPDU is for CCCH it can know the length of MAC SDU based on LCID value.

Figure 10:
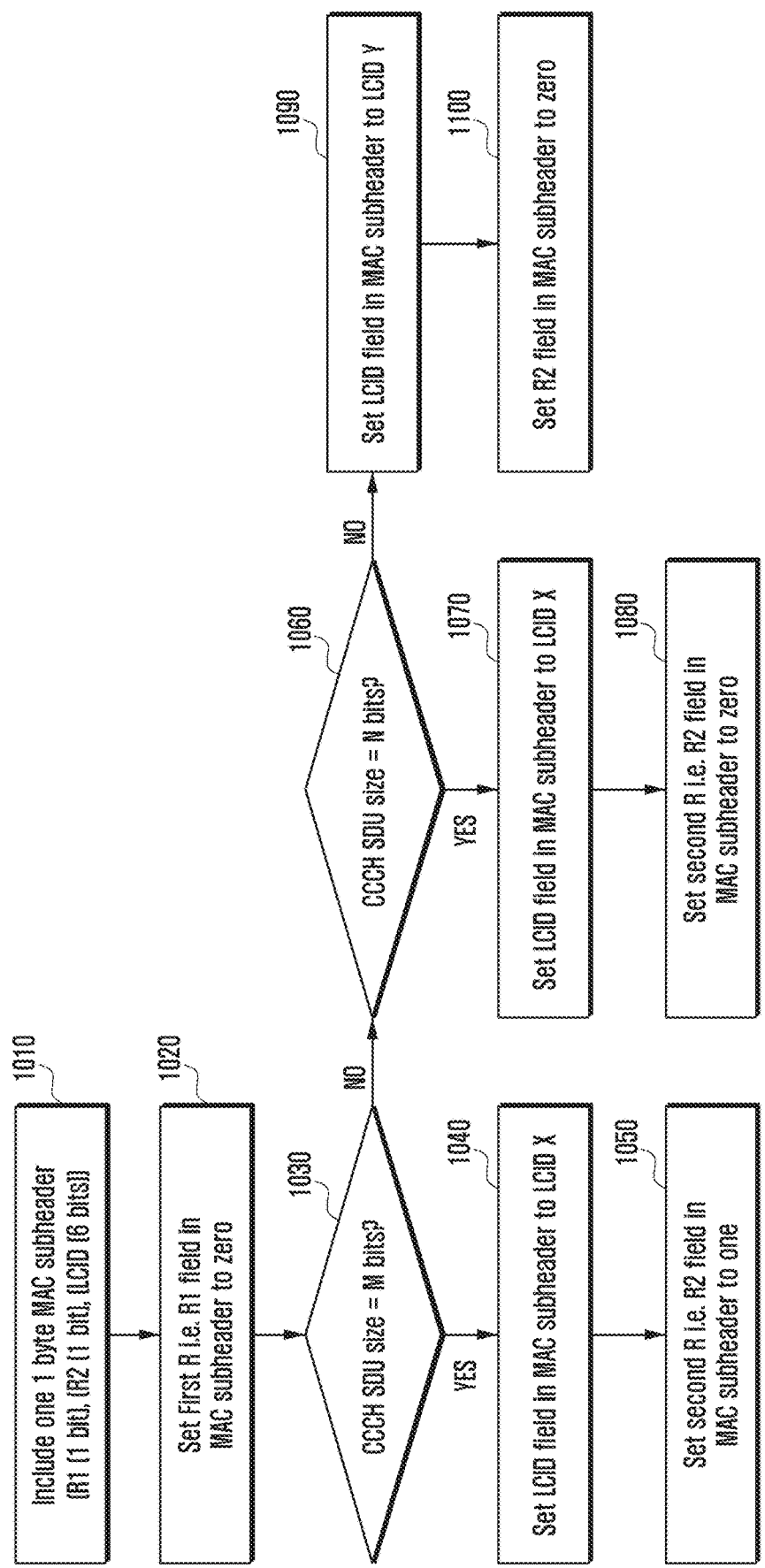
FIG. 10 shows the UE operations according to an embodiment of the disclosure.

D. FIG. 10 shows the UE operations according to an embodiment of the disclosure.

Referring to FIG. 10, UE includes one 1 byte MAC subheader at operation 1010. As shown in FIG. 5, the 1 byte MAC subheader may include two 1 bit R field and 6 bits LCID field. The UE sets first R, i.e. R1 field in the MAC subheader to zeros at operation 1020. In this embodiment, the UE sets the LCID field in the MAC header based on the size of CCCH SDU. The UE sets the LCID field in the MAC subheader to a pre-defined LCID X, if the size of CCCH SDU is M or N bits. Specifically, the UE identifies whether the size of CCCH SDU is M bits at operation 1030. If the size of CCCH SDU is M bits, the UE sets the LCID field in the MAC subheader to a pre-defined LCID X at operation 1040, and the UE sets second R field to 1 at operation 1050. The UE identifies whether the size of CCCH SDU is N bits at operation 1060. If the size of CCCH SDU is N bits, the UE sets the LCID field in the MAC subheader to a pre-defined LCID X at operation 1070, and the UE sets second R field to 0 at operation 1080. The UE sets the LCID field in the MAC subheader to a pre-defined LCID Y, if the size of CCCH SDU is neither M nor N bits, at operation 1090. If the size of CCCH SDU is neither M nor N bits, second R field is set to zero at operation 1100. The values of M and N are pre-defined in the system. In an example, M can be 48 bits and N can be 64 bits.

Figure 11:
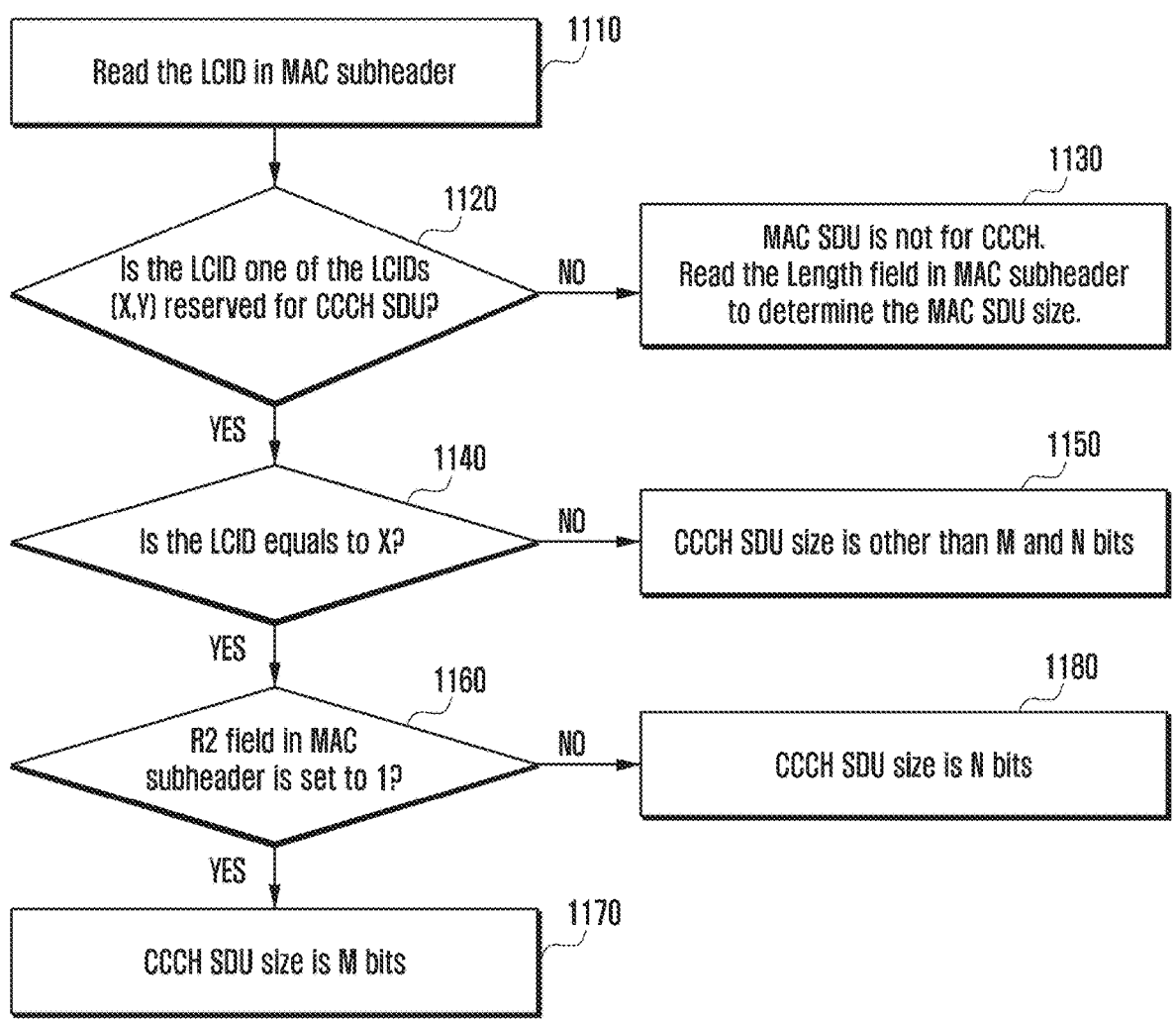
FIG. 11 shows the gNB operations according to an embodiment of the disclosure.

FIG. 11 shows the gNB operations according to an embodiment of the disclosure.

Referring to FIG. 11, gNB reads the LCID in MAC subheader at operation 1110. The gNB identifies whether the LCID is one of the LCIDs (X, Y) reserved for CCCH SDU at operation 1120. Based on the value of LCID in the MAC subheader of MAC subPDU, the gNB can know that MAC SDU in MAC subPDU is for CCCH or not. If the MAC SDU is not for CCCH, and LCID corresponds to dedicated control or traffic channel, the MAC subheader is a 2B or 3B MAC subheader and the gNB reads the Length field in MAC subheader to determine the MAC SDU size at operation 1130. If the MAC SDU is for CCCH, the gNB identifies whether the LCID is equals to X at operation 1140. If the LCID is not equals to X, the gNB determines that CCCH SDU size is other than M and N bits at operation 1150. If the LCID is equals to X, the gNB identifies whether R2 field in MAC subheader is set to 1 at operation 1160. If the R2 field in the MAC subheader is set to 1, the gNB determines that CCCH SDU size is M bits at operation 1170. If the R2 filed in the MAC subheader is not set to 1, the gNB determines that CCCH SDU size is N bits at operation 1180.

6. The UE transmits the generated MAC PDU to the gNB at operation 260.

In an embodiment, UE (i.e. transmitter) determines whether the RRC message to be transmitted is a CCCH message or not. If the RRC message to be transmitted is a CCCH message, the UE includes a MAC subPDU in MAC PDU wherein the MAC subPDU comprises of 1 byte R/R/LCID MAC subheader and CCCH message. If the RRC message to be transmitted is a DCCH message, the UE includes a MAC subPDU in MAC PDU wherein the MAC subPDU comprises of 2 byte or 3 byte R/F/LCID/L MAC subheader and DCCH message.

In an embodiment, gNB (i.e. receiver) determines whether the MAC SDU is a CCCH SDU or not in the received MAC subPDU. If the MAC SDU is a CCCH SDU, MAC subheader in MAC subPDU is a 1 byte R/R/LCID MAC subheader. If the MAC SDU is not a CCCH SDU, MAC subheader in MAC subPDU is a 2 byte or 3 byte R/F/LCID/L MAC subheader.

In an embodiment of the disclosure if size of CCCH SDU is M bits, UE selects one byte MAC subheader for CCCH and sets LCID in MAC subheader to a pre-defined LCID X. If size of CCCH SDU is other than M bits, UE sets LCID in MAC subheader to a pre-defined LCID Y. If CCCH SDU is other than M bits, UE selects 1 byte MAC subheader if UL grant size is N bits. If CCCH SDU is other than M bits, UE selects 2 byte MAC subheader if UL grant size is greater than N bits. M and N are pre-defined.

Embodiment 2

In NR, a 2 byte or 3 byte MAC subheader is added before each MAC SDU. The MAC subheader comprise of R, F, LCID and L fields.

LCID: The Logical Channel ID field identifies the logical channel instance of the corresponding MAC SDU. The LCID field size is 6 bits;

L: The Length field indicates the length of the corresponding MAC SDU. The size of the L field is indicated by the F field;

R: Reserved bit, set to zero.

In one embodiment of the disclosure 1 byte MAC subheader is used for MAC SDU if the MAC SDU is a CCCH SDU. Otherwise 2 byte or 3 byte MAC subheader is used for a MAC SDU. The CCCH SDU can be of multiple sizes (expressed in bits) and 1 byte MAC subheader is used for CCCH SDU irrespective of size of CCCH SDU. In one embodiment there can be two sizes (size X and size Y) of CCCH SDU. CCCH SDU of size X and size Y can also be referred as CCCH and CCCH1 SDU respectively. In the description term CCCH is commonly used for both CCCH and CCCH1.

Figure 12:
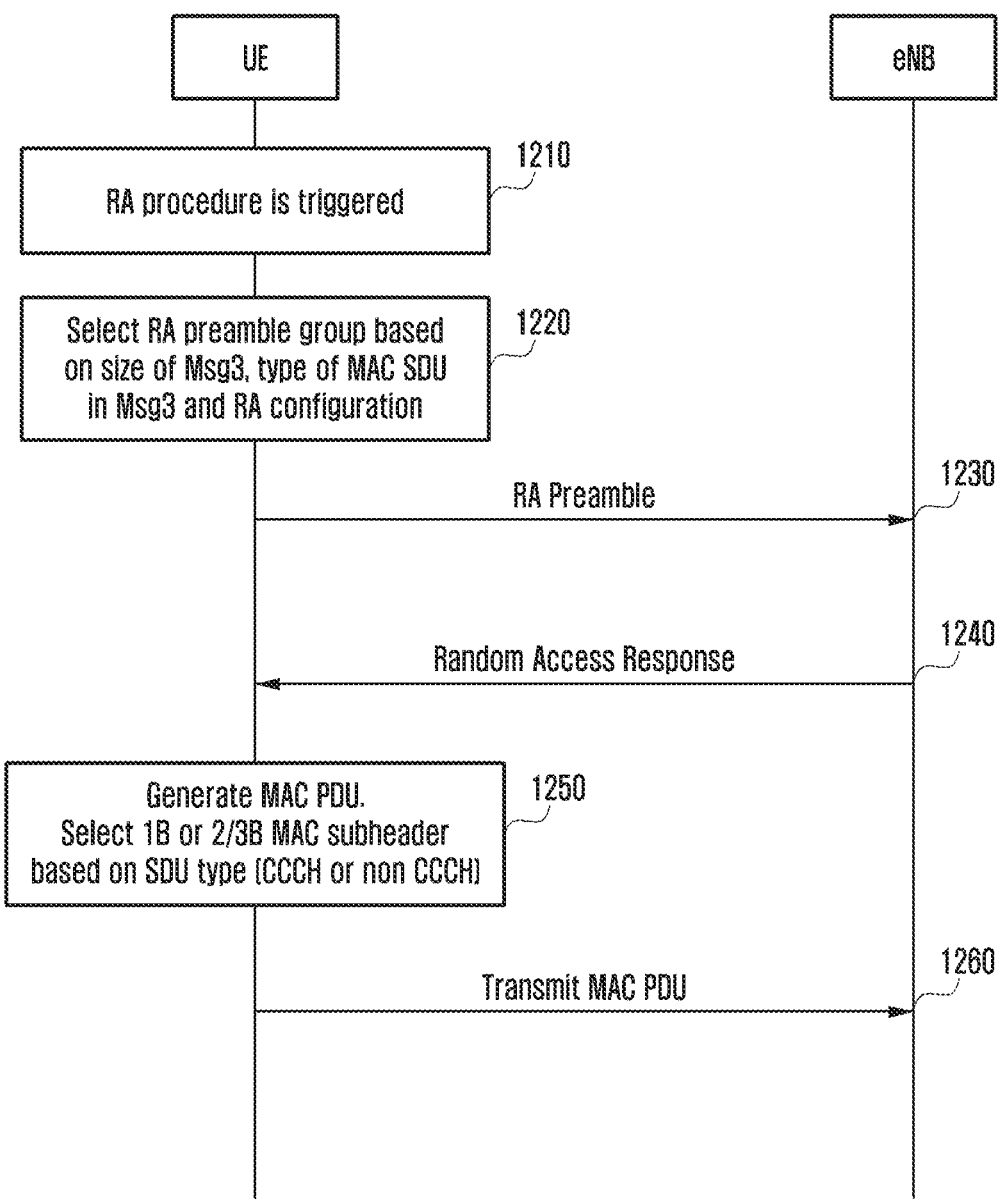
FIG. 12 shows the operations according to an embodiment of the disclosure.

FIG. 12 shows the operations according to Embodiment 2 of the disclosure.

1. RA procedure is triggered by UE at operation 1210.
2. UE selects RA preamble group based on the information indicated in the RA configuration (signaled in system information or in dedicated signaling) and considering the size of Msg3, type of MAC SDU in Msg3 at operation 1220. The detail operation of RA preamble group selection is as follows:

If RA preambles group B is configured (i.e. groupBconfigured IE is included in RA configuration) and the Msg3 does not include CCCH SDU and size of Msg3 (MAC SDU plus the corresponding MAC sub-header (2B or 3B)) is greater than messageSizeGroupA and the pathloss is less than PCMAX (of the serving cell performing the RA Procedure)—preambleReceivedTargetPower—deltaPreambleMsg3—messagePowerOffsetGroupB: select Random Access Preamble group B;

else if RA preambles group B is configured (i.e. groupB-configured IE is included in RA configuration) and the Msg3 includes CCCH SDU and size of Msg3 (MAC SDU plus the corresponding MAC sub-header (1B)) is greater than messageSizeGroupA: select Random Access Preamble group B;

else select RA preamble group A

3. UE selects an RA preamble from the selected RA preamble group and transmits Msg1, i.e. RA preamble at operation 1230.
4. UE receives an RAR corresponding to its transmitted RA preamble at operation 1240. RAR includes UL grant.
5. UE generates MAC PDU by concatenating MAC sub-header and MAC SDU at operation 1250. If MAC SDU is CCCH SDU, 1B R/R/LCID MAC subheader (FIG. 5) may be applied. If MAC SDU is not CCCH SDU, 2B or 3B R/F/LCID/L MAC subheader (FIGS. 3, 4) may be applied.

A. In an embodiment of the disclosure (as shown in FIG. 6), UE sets the LCID in MAC subheader to a pre-defined LCID X, if the size of CCCH SDU is M bits. UE sets the LCID in MAC subheader to a pre-defined LCID Y, if the size of CCCH SDU is N bits. UE sets the LCID in MAC subheader to a pre-defined LCID Z, if the size of CCCH SDU is other than M and N bits. The values of M and N are pre-defined in the system. In an example, M can be 48 bits and N can be 64 bits. Based on the value of LCID in MAC subheader of MAC subPDU, gNB can know that MAC SDU in MAC subPDU is for CCCH or not. If the MAC subPDU is for CCCH the gNB can know the length of MAC SDU based on LCID value. In an embodiment if the size of CCCH SDU is other than M and N bits and if there can be several CCCH SDU sizes other than M and N bits, UE can add 2 byte MAC subheader which includes the length field. GNB operations in an embodiment are shown in FIG. 7.

In an embodiment of the disclosure (as shown in FIG. 8), UE sets the LCID in MAC subheader to a pre-defined LCID X, if the size of CCCH SDU is M bits. UE sets the LCID in MAC subheader to a pre-defined LCID Y, if the size of CCCH SDU is N bits. The values of M and N are pre-defined in the system. In an example, M can be 48 bits and N can be 64 bits. Based on the value of LCID in MAC subheader of MAC subPDU, gNB can know that MAC SDU in MAC subPDU is for CCCH or not. If the MAC subPDU is for CCCH, the gNB can know the length of MAC SDU based on LCID value. GNB operations in an embodiment are shown in FIG. 9.

C. In an embodiment of the disclosure (as shown in FIG. 8), UE sets the LCID in MAC subheader to a pre-defined LCID X, if the size of CCCH SDU is M bits. UE sets the LCID in MAC subheader to a pre-defined LCID Y, if the size of CCCH SDU is other than M bits. The value of M is pre-defined in the system. In an example, M can be 48 bits. Based on the value of LCID in MAC subheader of MAC subPDU, gNB can know that MAC SDU in MAC subPDU is for CCCH or not. If the MAC subPDU is for CCCH, the gNB can know the length of MAC SDU based on LCID value. GNB operations in an embodiment are shown in FIG. 9.

D. In an embodiment of the disclosure (as shown in FIG. 10), UE sets the LCID in MAC subheader to a pre-defined LCID X, if the size of CCCH SDU is M or N bits. If the size of CCCH SDU is M bits, second R field is set to 1. If the size of CCCH SDU is N bits, second R field is set to 0. UE sets the LCID in MAC subheader to a pre-defined LCID Y, if the size of CCCH SDU is neither M nor N bits. If the size of CCCH SDU is neither M nor N bits, second R field is set to zero. The values of M and N are pre-defined in the system. In an example, M can be 48 bits and N can be 64 bits. GNB operations in an embodiment are shown in Figure FIG. 10.

6. The UE transmits the generated MAC PDU to the gNB at operation 1260.

In an embodiment, UE (i.e. transmitter) determines whether the MAC SDU to be transmitted is a CCCH SDU or not. If the MAC SDU to be transmitted is a CCCH SDU, the UE includes a MAC subPDU in MAC PDU wherein the MAC subPDU comprises of 1 byte R/R/LCID MAC subheader and MAC SDU. If the MAC SDU to be transmitted is not a CCCH SDU, the UE includes a MAC subPDU in MAC PDU wherein the MAC subPDU comprises of 2 byte or 3 byte R/F/LCID/L MAC subheader and MAC SDU.

In an embodiment, gNB (i.e. receiver) determines whether the MAC SDU is a CCCH SDU or not in the received MAC subPDU. If the MAC SDU is a CCCH SDU, MAC subheader in MAC subPDU is a 1 byte R/R/LCID MAC subheader. If the MAC SDU is not a CCCH SDU, MAC subheader in MAC subPDU is a 2 byte or 3 byte R/F/LCID/L MAC subheader.

In an embodiment of the disclosure if size of CCCH SDU is M bits, UE selects one byte MAC subheader for CCCH and sets LCID in MAC subheader to a pre-defined LCID X. If size of CCCH SDU is other than M bits, UE sets LCID in MAC subheader to a pre-defined LCID Y. If CCCH SDU is other than M bits, UE selects 1 byte MAC subheader if UL grant size is N bits. If CCCH SDU is other than M bits, UE selects 2 byte MAC subheader if UL grant size is greater than N bits. M and N are pre-defined.

Signaling RA Resources for System Information (SI) Request

In NR there is an association between synchronization signal (SS) blocks (SSBs) and PRACH preambles/PRACH occasions. This enables gNB to identify the TX beam for transmitting Msg2. This also enables gNB to receive Msg 1 using specific RX beam(s) in specific PRACH occasion. So, the RA resource for each SI request needs to be signaled per SSB.

si-Request-Resources can be signaled in SIB1 wherein si-Request-Resources is a list of SI-Request-Resources. si-Request-Resources indicates RA resources for a SI request. Each entry in the list si-Request-Resources contains RA resources corresponding to a SI request. If there is only one entry in the list, the RA resources in this entry are used for all SI messages which are provided on demand. Otherwise RA resources in 1st entry in the list corresponds to first on demand SI message in schedulingInfoList, RA resources in 2nd entry in the list corresponds to second on demand SI message in schedulingInfoList and so on.

There are several options to signal RA resources for a SI request, i.e. to define SI-Request-Resources.

Approach 1:

For each SI request, ra-PreambleIndex can be signaled for each SSB explicitly as shown below. See Table 1 below. Network (i.e. gNB) signals the same in system information, i.e. SIB1; ra-PreambleIndexList is signaled for each SI request wherein the ra-PreambleIndexList includes SSB index and ra-PreambleIndex. ra-ssb-OccasionMaskIndex is also signaled for each SI request; ra-ssb-OccasionMaskIndex is the index to a pre-defined PRACH mask index table wherein each entry in the table indicates the random access channel (RACH) occasions(s) to be used. Note that ra-ssb-OccasionMaskIndex is not signaled for each SSB. The signaled value of ra-ssb-OccasionMaskIndex is applicable to all SSBs. UE selects a suitable SSB (above a threshold configured by network in system information). UE then selects a preamble corresponding to this SSB from SI-Request-Resources corresponding to SI message which UE wants to request. UE also selects a RACH occasion (indicated by ra-ssb-OccasionMaskIndex or rach occasion index) corresponding to this SSB from SI-Request-Resources corresponding to SI message which UE wants to request. If ra-ssb-OccasionMaskIndex is not signaled, UE can select next available RACH occasion from the RACH occasions corresponding to this SSB.

This approach may lead to significant overhead (up to 4+(6+6)*64=772 bits for one SI request configuration, where ra-ssb-OccasionMaskIndex is 4 bits, ra-PreambleIndex is 6 bits, SSB-Index is 6 bits and number of SSBs is 64) because of large number of SSBs (up to 64).

TABLE 1

| Parameters (ASN.1) for RA Resources for SI Request |
|---|
| si-Request-Config     SI-Request-Config OPTIONAL,<br>-- Configuration for Msg1 based SI Request<br>SI-Request-Config ::= SEQUENCE {<br>  --List of SI Request Resources<br>  si-Request-Resources ::= SEQUENCE (SIZE (1..maxSI-Message))<br>OF  SI-Request-Resources<br>  }<br>}<br>-- Resources for a SI Request<br>SI-Request-Resources::=          SEQUENCE {<br>    ra-PreambleIndexList         SEQUENCE (SIZE<br>(1..maxSSBs)) OF RAPreambleIndex,<br>    ra-ssb-OccasionMaskIndex     INTEGER (0..15) |

TABLE 1-continued

Parameters (ASN.1) for RA Resources for SI Request

```
}
RAPreambleIndex::=      SEQUENCE {
    ssb                 SSB-Index,
    ra-PreambleIndex    INTEGER (0..63)
}
```

Approach 2:

Alternate approach to embodiment 1 is to signal a list (ra-PreambleIndexList) of ra-PreambleIndexes for each SI request wherein the SSB Index associated with a ra-PreambleIndex is not signaled; ra-PreambleIndexList is included in SI-Request-Resources. See Table 2 below. Network (i.e. gNB) signals the same in system information, i.e. SIB1. If multiple SSBs are mapped to same PRACH occasion, different dedicated PRACH preambles are needed to distinguish these SSBs. If only one SSB is mapped to one PRACH occasion or to multiple PRACH occasions, only one dedicated preamble is needed. So, if the number of SSBs per PRACH occasion is less than or equal to 1, the size of this list is 1. If the number of SSBs per PRACH occasion is less than one, preamble with preamble index=ra-PreambleStartIndex is used for SI request and corresponds to all SSBs. If the number of SSBs per PRACH occasion is larger than or equal to 1, the size of this list is equal to number of SSBs per PRACH occasion and the 'ith' preamble in this list (ra-PreambleIndexList) corresponds to ith SSB among the SSBs associated with a PRACH Occasion. The maximum overhead for one SI request configuration is 4+6*16=100 bits where ra-ssb-OccasionMaskIndex is 4 bits, RAPreambleIndex is 6 bits, maximum number of SSBs per PRACH Occasion is 16.

TABLE 2

Parameters (ASN.1) for RA Resources for SI Request

```
si-Request-Config       SI-Request-Config OPTIONAL,
-- Configuration for Msg1 based SI Request
SI-Request-Config ::= SEQUENCE {
    --List of SI Request Resources
    si-Request-Resources ::= SEQUENCE (SIZE (1..maxSI-Message))
OF  SI-Request-Resources
    }
}
-- Resources for a SI Request
SI-Request-Resources::=         SEQUENCE {
    ra-PreambleIndexList        SEQUENCE (SIZE (1..16))
OF  INTEGER (0..63),
    ra-ssb-OccasionMaskIndex    INTEGER (0..15)
}
```

FIG. 13 is an example illustration of mapping preambles in ra-PreambleIndexList to SSBs.

In the example 4 SSBs are mapped per PRACH occasion and there are 16 SSBs. In this case ra-PreambleIndexList includes four preamble indexes (e.g. P1, P2, P3 and P4). The 'ith' preamble in this list corresponds to ith SSB among the SSBs associated with a PRACH Occasion.

1. SSB0 to SSB 3 are mapped to RO #1. So P1 corresponds to first SSB (i.e. SSB 0) associated with RO #1, P2 corresponds to second SSB (i.e. SSB1) associated with RO #1, P3 corresponds to third SSB (i.e. SSB2) associated with RO #1, and P4 corresponds to fourth SSB (i.e. SSB3) associated with RO #1.

2. SSB4 to SSB 7 are mapped to RO #2. So P1 corresponds to first SSB (i.e. SSB 4) associated with RO #2, P2 corresponds to second SSB (i.e. SSB5) associated with RO #2, P3 corresponds to third SSB (i.e. SSB6) associated with RO #2, and P4 corresponds to fourth SSB (i.e. SSB7) associated with RO #2.

3. SSB8 to SSB 11 are mapped to RO #3. So P1 corresponds to first SSB (i.e. SSB 8) associated with RO #3, P2 corresponds to second SSB (i.e. SSB9) associated with RO #3, P3 corresponds to third SSB (i.e. SSB10) associated with RO #3, and P4 corresponds to fourth SSB (i.e. SSB11) associated with RO #3.

4. SSB12 to SSB 15 are mapped to RO #4. So P1 corresponds to first SSB (i.e. SSB 12) associated with RO #4, P2 corresponds to second SSB (i.e. SSB13) associated with RO #4, P3 corresponds to third SSB (i.e. SSB14) associated with RO #4, and P4 corresponds to fourth SSB (i.e. SSB15) associated with RO #4.

UE selects a suitable SSB (above a threshold configured by network in system information). UE then selects a preamble corresponding to this SSB from SI-Request-Resources corresponding to SI message which UE wants to request. UE also selects a RACH occasion (indicated by ra-ssb-OccasionMaskIndex or rach occasion index) corresponding to this SSB from SI-Request-Resources corresponding to SI message which UE wants to request. UE then transmits Msg1 using selected preamble and RACH occasion.

Embodiment 2 in an embodiment, instead of signaling a list of ra-PreambleIndexes as explained in embodiment 1, ra-PreambleStartIndex indicating a start index of at least one RA preamble for each SI request can be signaled as shown below. ra-PreambleStartIndex is included in SI-Request-Resources. See Table 3 below. Network (i.e. gNB) signals the same in system information, i.e. SIB1. UE can determine the list of ra-PreambleIndexes based on ra-PreambleStartIndex and number of SSBs per RACH Occasion. The number of SSBs per RACH Occasion is also signaled in system information, i.e. SIB1.

Mapping of preambles to SSBs based on ra-PreambleStartIndex (option 1): If the number of SSBs per PRACH occasion is less than one, the preamble with preamble index=ra-PreambleStartIndex is used for SI request. This preamble is used for any SSB selected by UE. If the number of SSBs per PRACH occasion is larger than or equal to 1, PRACH preambles from ra-PreambleStartIndex to 'ra-PreambleStartIndex+number of SSBs per RACH Occasion−1' are used for this SI request. The 'ith' preamble in this list corresponds to ith SSB among the SSBs associated with a RACH Occasion. In other words, if N SSBs are associated with a RACH occasion, where N>=1, for the $i^{th}$ SSB (i=0, ..., N−1) mapped to a RACH occasion, preamble with preamble index=ra-PreambleStartIndex+i is used for SI request; For N<1, the preamble with preamble index=ra-PreambleStartIndex is used for this SI request.

Referring to FIG. 13, 4 SSBs are mapped per PRACH occasion and there are 16 SSBs. Network signals ra-PreambleStartIndex for SI request in SI-Request-Resources. PRACH preambles from ra-PreambleStartIndex to 'ra-PreambleStartIndex+3' are used for this SI request.

1. SSB0 to SSB 3 are mapped to RO #1. So P1 (indicated by ra-PreambleStartIndex) corresponds to SSB0, P2 (indicated by ra-PreambleStartIndex+1) corresponds to SSB1, P3 (indicated by ra-PreambleStartIndex+2) corresponds to SSB2, and P4 (indicated by ra-PreambleStartIndex+3) corresponds to SSB3.

2. SSB4 to SSB 7 are mapped to RO #2. So P1 (indicated by ra-PreambleStartIndex) corresponds to SSB4, P2 (indicated by ra-PreambleStartIndex+1) corresponds to SSB5, P3

(indicated by ra-PreambleStartIndex+2) corresponds to SSB6, and P4 (indicated by ra-PreambleStartIndex+3) corresponds to SSB7.

3. SSB8 to SSB 11 are mapped to RO #3. So P1 (indicated by ra-PreambleStartIndex) corresponds to SSB8, P2 (indicated by ra-PreambleStartIndex+1) corresponds to SSB9, P3 (indicated by ra-PreambleStartIndex+2) corresponds to SSB10, and P4 (indicated by ra-PreambleStartIndex+3) corresponds to SSB11.

4. SSB12 to SSB 15 are mapped to RO #3. So P1 (indicated by ra-PreambleStartIndex) corresponds to SSB12, P2 (indicated by ra-PreambleStartIndex+1) corresponds to SSB13, P3 (indicated by ra-PreambleStartIndex+2) corresponds to SSB14, and P4 (indicated by ra-PreambleStartIndex+3) corresponds to SSB15.

TABLE 3

Parameters (ASN.1) for RA Resources for SI Request

```
si-Request-Config        SI-Request-Config OPTIONAL,
-- Configuration for Msg1 based SI Request
SI-Request-Config ::= SEQUENCE  {
    --List of SI Request Resources
    si-Request-Resources ::= SEQUENCE (SIZE (1..maxSI-Message))
OF  SI-Request-Resources
    }
}
SI-Request-Resources::=             SEQUENCE {
    ra-PreambleStartIndex           INTEGER (0..63),
    ra-ssb-OccasionMaskIndex        INTEGER (0..15)
}
```

Mapping of preambles to SSBs based on ra-PreambleStartIndex (option 2): If N SSBs are associated with a RACH occasion, where N>=1, for the $i^{th}$ SSB (i=0, . . . , N−1) mapped to a RACH occasion, preamble with preamble index=ra-PreambleStartIndex+i*(64/N) is used for SI request; For N<1, the preamble with preamble index=ra-PreambleStartIndex is used for this SI request. In the example of FIG. 13, 4 SSBs are mapped per PRACH occasion and there are 16 SSBs. Network signals ra-PreambleStartIndex for SI request in SI-Request-Resources.

SSB0 to SSB 3 are mapped to RO #1. So P1 (indicated by ra-PreambleStartIndex+0*(64/4)) corresponds to SSB0, P2 (indicated by ra-PreambleStartIndex+(64/4)) corresponds to SSB1, P3 (indicated by ra-PreambleStartIndex+2*(64/4)) corresponds to SSB2, and P4 (indicated by ra-PreambleStartIndex+3*(64/4)) corresponds to SSB3.

SSB4 to SSB 7 are mapped to RO #2. So P1 (indicated by ra-PreambleStartIndex+0*(64/4)) corresponds to SSB4, P2 (indicated by ra-PreambleStartIndex+1*(64/4)) corresponds to SSB5, P3 (indicated by ra-PreambleStartIndex+2*(64/4)) corresponds to SSB6, and P4 (indicated by ra-PreambleStartIndex+3*(64/4)) corresponds to SSB7.

SSB8 to SSB 11 are mapped to RO #3. So P1 (indicated by ra-PreambleStartIndex+0*(64/4)) corresponds to SSB8, P2 (indicated by ra-PreambleStartIndex+1*(64/4)) corresponds to SSB9, P3 (indicated by ra-PreambleStartIndex+2*(64/4)) corresponds to SSB10, and P4 (indicated by ra-PreambleStartIndex+3*(64/4)) corresponds to SSB11.

SSB12 to SSB 15 are mapped to RO #3. So P1 (indicated by ra-PreambleStartIndex+0*(64/4)) corresponds to SSB12, P2 (indicated by ra-PreambleStartIndex+1*(64/4)) corresponds to SSB13, P3 (indicated by ra-PreambleStartIndex+2*(64/4)) corresponds to SSB14, and P4 (indicated by ra-PreambleStartIndex+3*(64/4)) corresponds to SSB15.

UE receives at least one SSB from gNB, and UE selects a suitable SSB (above a threshold configured by network in system information) among the at least one SSB. If none of SSB is suitable, UE may select any SSB. UE then selects a preamble corresponding to this SSB from SI-Request-Resources corresponding to SI message which UE wants to request. UE also selects a RACH occasion (indicated by ra-ssb-OccasionMaskIndex or rach occasion index) corresponding to this SSB from SI-Request-Resources corresponding to SI message which UE wants to request. If ra-ssb-OccasionMaskIndex is not signaled, UE can select next available RACH occasion from the RACH occasions corresponding to selected SSB. UE then transmits Msg1 using selected preamble and RACH occasion.

Embodiment 3

In embodiment 3, instead of signaling ra-PreambleStartIndex for each SI request as explained in embodiment 2, ra-PreambleStartIndex can be indicated for on demand SI. UE can determine the list of ra-PreambleIndexes based on ra-PreambleStartIndex, number of SSBs per RACH Occasion and configuration type.

If configuration type is common, this means there is a common configuration for all on Demand SI messages. This can be indicated by signaling configuration type set to 'common'. Alternately, if dedicatedConfig is not included then configuration type is common. In this case Msg1 (i.e. SI request) transmitted by UE does not indicate request for a specific SI message and upon reception of Msg1 network transmits all On-Demand SI messages. In this case if the number of SSBs per PRACH occasion is larger than or equal to 1, PRACH preambles from ra-PreambleStartIndex to 'ra-PreambleStartIndex+number of SSBs per RACH Occasion−1' are used for SI request. The 'ith' preamble in this list corresponds to ith SSB among the SSBs associated with a RACH Occasion. In the example of FIG. 13, 4 SSBs are mapped per PRACH occasion and there are 16 SSBs. Network signals ra-PreambleStartIndex for SI request in SI-Request-Resources. PRACH preambles from ra-PreambleStartIndex to 'ra-PreambleStartIndex+3' are used for this SI request. If the number of SSBs per PRACH occasion is less than 1, preamble index=ra-PreambleStartIndex is used for SI request for any SSB.

If configuration type is dedicated, this means there is a dedicated configuration for each on Demand SI message. This can be indicated by signaling configuration type set to 'dedicated.' Alternately, if dedicatedConfig is included then configuration type is dedicated. In this case, if the number of SSBs per PRACH occasion is larger than or equal to 1

1. The list of PRACH preambles from ra-PreambleStartIndex to 'ra-PreambleStartIndex+number of SSBs per RACH Occasion−1' are used for first On-Demand SI message in schedulingInfoList. Mapping between this list of preambles and SSBs is determined as explained in embodiments 2 and 3. SchedulingInfoList is a list of SI message and indicates which SI message is On demand or broadcasted.

2. The list of PRACH preambles from 'ra-PreambleStartIndex+number of SSBs per RACH Occasion' to 'ra-PreambleStartIndex+2*number of SSBs per RACH Occasion−1' are used for second On-Demand SI message in schedulingInfoList. Mapping between this list of preambles and SSBs is determined as explained in embodiments 2 and 3. schedulingInfoList is a list of SI message and indicates which SI message is On demand or broadcasted.

3. The list of PRACH preambles from 'ra-PreambleStartIndex+2*number of SSBs per RACH Occasion' to 'ra-PreambleStartIndex+3*number of SSBs per RACH Occasion−1' are used for third On-Demand SI message in schedulingInfoList. Mapping between this list of preambles and SSBs is determined as explained in embodiments 2 and 3. schedulingInfoList is a list of SI message and indicates which SI message is On demand or broadcasted.

4. The list of PRACH preambles from 'ra-PreambleStartIndex+(n−1)*number of SSBs per RACH Occasion' to 'ra-PreambleStartIndex+n*number of SSBs per RACH Occasion−1' are used for nth On-Demand SI message in schedulingInfoList. Mapping between this list of preambles and SSBs is determined as explained in embodiments 2 and 3. schedulingInfoList is a list of SI message and indicates which SI message is On demand or broadcasted.

If the number of SSBs per PRACH occasion is less than or equal to 1, preamble index=ra-PreambleStartIndex+n−1 are used for nth On-Demand SI message for any SSB.

TABLE 4

Parameters (ASN.1) for RA Resources for SI Request

```
si-Request-Config         SI-Request-Config OPTIONAL,
-- Configuration for Msg1 based SI Request
SI-Request-Config ::= SEQUENCE {
    ra-PreambleStartIndex        INTEGER (0..63),
    configurationType            ENUM {Common, Dedicated}
    OR
    dedicatedConfig              ENUM {TRUE} OPTIONAL,
  }
}
```

UE selects a suitable SSB (above a threshold configured by network in system information). UE then selects a preamble corresponding to this SSB from the preambles corresponding to SI message which UE wants to request. UE also selects a RACH occasion corresponding to this SSB. UE then transmits Msg1 using selected preamble and RACH occasion.

In an embodiment, ra-PreambleStartIndex is equal to totalNumberOfRA-Preambles wherein totalNumberOfRA-Preambles is signaled in system information (e.g. SIB1). The totalNumberOfRA-Preambles indicates the number of RA preambles used for normal random access procedure other than SI request. UE can determine the list of ra-PreambleIndexes based on ra-PreambleStartIndex, number of SSBs per RACH Occasion and configuration type.

If configuration type is common, this means there is a common configuration for all on Demand SI messages. This can be indicated by signaling configuration type set to 'common'. Alternately, if dedicatedConfig is not included then configuration type is common. In this case Msg1 (i.e. SI request) transmitted by UE does not indicate request for a specific SI message and upon reception of Msg1 network transmits all On-Demand SI messages. In this case PRACH preambles from ra-PreambleStartIndex to 'ra-PreambleStartIndex+number of SSBs per RACH Occasion−1' are used for SI request. The 'ith' preamble in this list corresponds to ith SSB amongst the SSBs associated with a RACH Occasion. In the example of FIG. 13, 4 SSBs are mapped per PRACH occasion and there are 16 SSBs. Network signals ra-PreambleStartIndex for SI request in SI-Request-Resources. PRACH preambles from ra-PreambleStartIndex to 'ra-PreambleStartIndex+3' are used for this SI request.

If configuration type is dedicated, this means there a dedicated configuration for each on Demand SI message. This can be indicated by signaling configuration type set to 'dedicated'. Alternately, if dedicatedConfig is included then configuration type is dedicated. In this case, if the number of SSBs per PRACH occasion is larger than or equal to 1, 1. The list of PRACH preambles from ra-PreambleStartIndex to 'ra-PreambleStartIndex+number of SSBs per RACH Occasion−1' are used for first On-Demand SI message in schedulingInfoList. Mapping between this list of preambles and SSBs is determined as explained in embodiments 2 and 3; schedulingInfoList is a list of SI message and indicates which SI message is On demand or broadcasted.

2. The list of PRACH preambles from 'ra-PreambleStartIndex+number of SSBs per RACH Occasion' to 'ra-PreambleStartIndex+2*number of SSBs per RACH Occasion−1' are used for second On-Demand SI message in schedulingInfoList. Mapping between this list of preambles and SSBs is determined as explained in embodiments 2 and 3; schedulingInfoList is a list of SI message and indicates which SI message is On demand or broadcasted.

3. The list of PRACH preambles from 'ra-PreambleStartIndex+2*number of SSBs per RACH Occasion' to 'ra-PreambleStartIndex+3*number of SSBs per RACH Occasion−1' are used for third On-Demand SI message in schedulingInfoList. Mapping between this list of preambles and SSBs is determined as explained in embodiments 2 and 3; schedulingInfoList is a list of SI message and indicates which SI message is On demand or broadcasted.

4. The list of PRACH preambles from 'ra-PreambleStartIndex+(n−1)*number of SSBs per RACH Occasion' to 'ra-PreambleStartIndex+n*number of SSBs per RACH Occasion−1' are used for nth On-Demand SI message in schedulingInfoList. Mapping between this list of preambles and SSBs is determined as explained in embodiments 2 and 3. schedulingInfoList is a list of SI message and indicates which SI message is On demand or broadcasted. If the number of SSBs per PRACH occasion is less than or equal to 1, preamble index=ra-PreambleStartIndex+n−1 are used for nth On-Demand SI message for any SSB.

TABLE 5

Parameters (ASN.1) for RA Resources for SI Request

```
si-Request-Config         SI-Request-Config OPTIONAL,
-- Configuration for Msg1 based SI Request
SI-Request-Config ::= SEQUENCE {
    configurationType            ENUM {Common, Dedicated}
    OR
    dedicatedConfig              ENUM {TRUE} OPTIONAL,
  }
}
```

UE selects a suitable SSB (above a threshold configured by network in system information). UE then selects a preamble corresponding to this SSB from the preambles corresponding to SI message which UE wants to request. UE also selects a RACH occasion corresponding to this SSB. UE then transmits Msg1 using selected preamble and RACH occasion.

Determining the Discontinuous Reception (DRX) Cycle of UE

In the existing system UE determines the DRX cycle (T) for calculating its paging occasion (PO) as follows:

T1: UE specific DRX cycle value (configured by upper layer signaling e.g. non access stratum (NAS)).

T2: Default DRX cycle value (broadcasted in system information)

$T=\min(T1,T2)$

In NR this may not work as T2 is multiple of remaining minimum system information (RMSI) PDCCH monitoring occasions interval. It is multiple of 20 ms or multiple of SS burst period (i.e. 5, 10, 20, 40, 80, 160 ms). Since T1 is configured by upper layer and is agnostic to RMSI PDCCH monitoring occasions intervals.

Figure 14:
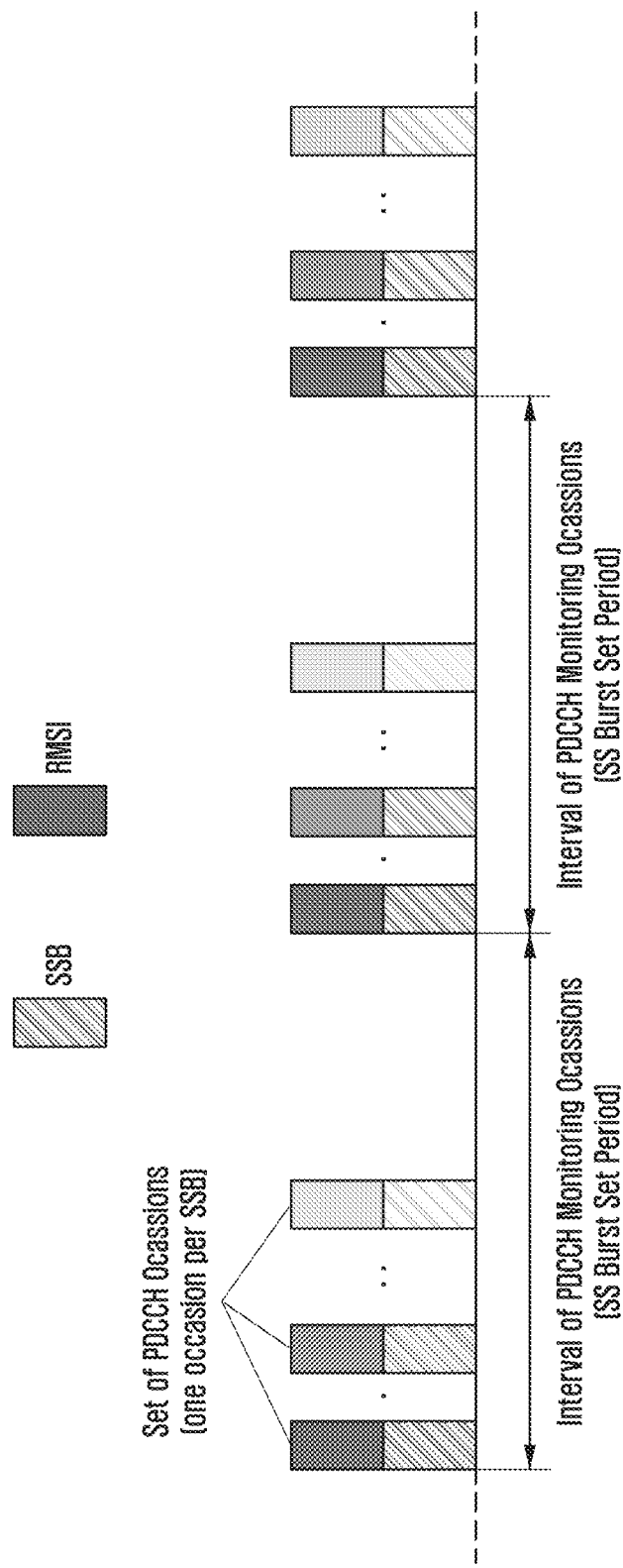
FIG. 14 illustrates determining the discontinuous reception (DRX) cycle of UE where remaining minimum system information (RMSI) is frequency division multiplexed (FDMed) with SSB according to an embodiment of the disclosure.

FIG. 14 illustrates determining the DRX cycle of UE where RMSI is frequency division multiplexed (FDMed) with SSB according to an embodiment of the disclosure.

Figure 15:
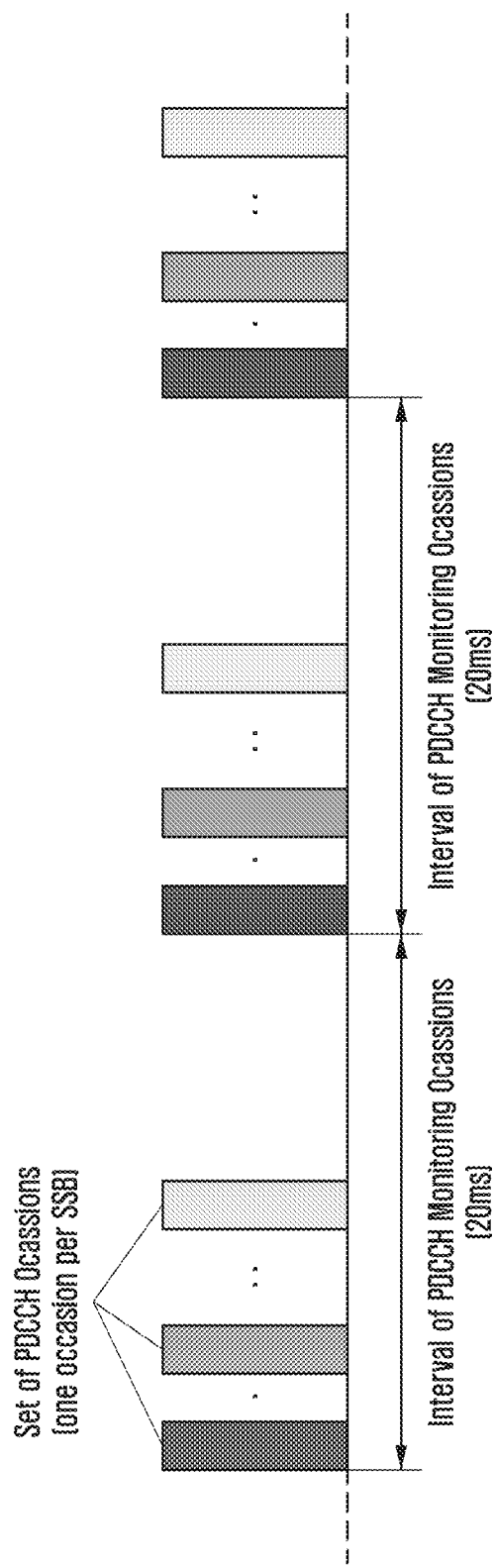
FIG. 15 illustrates determining the DRX cycle of UE where RMSI is not FDMed with SSB according to an embodiment of the disclosure.

FIG. 15 illustrates determining the DRX cycle of UE where RMSI is not FDMed with SSB according to an embodiment of the disclosure.

In an embodiment, UE determines the DRX cycle (T) for calculating its PO as follows:

X is the interval of PDCCH monitoring occasions for RMSI as shown in FIGS. 14 and 15.

X=20 ms if RMSI multiplexing pattern is pattern 1;

X=SS burst set period if RMSI multiplexing pattern is 2 or 3. UE can determine the multiplexing pattern from the parameter PDCCHConfigSIB1 in MIB.

$$T3 = [T1/X]*(X)$$

$$T = \min(T3, T2)$$

In an embodiment, UE determines the DRX cycle (T) for calculating its PO as follows:

X is the interval of PDCCH monitoring occasions for RMSI as shown in FIGS. 14 and 15.

X=20 ms if RMSI multiplexing pattern is pattern 1; X=SS burst set period if RMSI multiplexing pattern is 2 or 3; UE can determine the multiplexing pattern from the parameter PDCCHConfigSIB1 in MIB.

$$T3 = [T1 \bmod X] + T1$$

$$T = \min(T3, T2)$$

Carrier Aggregation (CA) aspects for Bandwidth Part (BWP) switching upon initiation of RA procedure CA aspects are not considered yet for BWP switching upon initiation of RA procedure.

For RA procedure initiated on secondary cell (SCell) (e.g. SCell X), RAR is received on special cell (SpCell). The term SpCell refers to the primary cell (PCell) of the master cell group (MCG) or the primary secondary cell (PSCell) of the secondary cell group (SCG). A SCell provides additional radio resources on top of SpCell.

a) If RA resources are not configured for the active UL BWP of SCell X, UE needs to switch the UL BWP to initial UL BWP of SCell X. There is no need to switch the DL BWP of SCell X. In RA procedure is initiated on SCell, RACH preamble is transmitted on SCell but the RAR is received on SpCell. Switching the DL BWP of SCell X will unnecessarily interrupt the DL transmissions on SCell X. Since the contention free RA resource is used for RA procedure initiated on SCell, gNB can identify the UE upon receiving the RACH preamble and transmit the RAR on active DL BWP of SpCell. In case of RA procedure initiated on SpCell, RAR is received on SpCell. For RA procedure initiated on SpCell, contention based RA resource can be used. gNB cannot identify the UE based on received RACH preamble and hence cannot identify the active DL BWP of UE. So DL BWP switching to an initial DL BWP is needed.

b) If RA resources are configured for the active UL BWP of SCell X, the switching of DL BWP of SCell X based on linkage between UL BWP and DL BWP of SCell X is not needed. In RA procedure is initiated on SCell, RACH preamble is transmitted on SCell but the RAR is received on SpPCell. Switching the DL BWP of SCell X will unnecessarily interrupt the DL transmissions on SCell X. Since the contention free RA resource is used for RA procedure initiated on SCell, gNB can identify the UE upon receiving the RACH preamble and transmit the RAR on active DL BWP of SpCell. For RA procedure initiated on SpCell, contention based RA resource can be used. gNB cannot identify the UE based on received RACH preamble and hence cannot identify the active DL BWP of UE. So DL BWP switching based on linkage is needed.

c) If common search space (CSS) is not configured in active DL BWP of SpCell, UE cannot receive RAR, so UE should switch to initial DL BWP of SpCell.

It is proposed that if RA procedure is initiated on SCell and if CSS is not configured in active DL BWP of SpCell, UE switch to initial DL BWP of SpCell. If RA resources are not configured in active UL BWP, switching to initial DL BWP is applied for RA procedure initiated on SpCell. If RA resources are configured in active UL BWP, switching to DL BWP linked to UL BWP is applied for RA procedure initiated on SpCell.

Upon initiation of the RA procedure on a Serving Cell, the MAC entity shall for this Serving Cell:

1> if PRACH occasions are configured for the active UL BWP:
    2> If the Serving Cell is a SpCell:
        3> if the active DL BWP does not have the same bwp-Id as the active UL BWP:
            4> switch the active DL BWP to the DL BWP with the same bwp-Id as the active UL BWP;
1> else (i.e. PRACH occasions are not configured for the active UL BWP):
    2> switch the active UL BWP to BWP indicated by initialUplinkBWP;
    2> If the Serving Cell is a SpCell:
        3> switch the active DL BWP to BWP indicated by initialDownlinkBWP;
1> If the Serving Cell is a SCell:
    2> If CSS is not configured for active DL BWP of SpCell:
        3> switch the active DL BWP of SpCell to BWP indicated by initialDownlinkBWP;
1> Perform the Random Access procedure on active DL BWP and UL BWP of associated serving cell(s);

In an embodiment, upon initiation of RA procedure on a serving cell, a UE identifies whether PRACH occasions are configured for an active UL BWP of a serving cell. If PRACH occasions are configured for the active UL BWP, and the Serving Cell is a SpCell, and the active DL BWP does not have the same bwp-Id, i.e., BWP identifier as the active UL BWP, the UE switches the active DL BWP to the DL BWP with the same bwp-Id, i.e., BWP identifier as the active UL BWP.

If PRACH occasions are not configured for the active UL BWP, the UE switches the active UL BWP to an initial UL BWP configuration for the serving cell. The initial UL BWP configuration may be indicated by initialUplinkBWP in system information. If PRACH occasions are not configured for the active UL BWP and the Serving Cell is a SpCell, the UE also switches the active DL BWP to an initial DL BWP configuration of the SpCell. The initial DL BWP configuration may be indicated by initialDownlinkBWP in system information.

The UE performs the RA procedure on the active DL BWP of the SpCell and the active UL BWP of the serving cell.

Alternate Embodiment 1

During the Random Access procedure on a Serving Cell, the MAC entity shall for this Serving Cell:

> 1> if PRACH occasions are not configured for the active UL BWP:
> 2> switch the active UL BWP to BWP indicated by initialUplinkBWP;
> 2> if the Random Access Preamble is selected from contention based Random Access Preambles:
> 3> switch the active DL BWP to BWP indicated by initialDownlinkBWP.
> 1> else:
> 2> if the Random Access Preamble is selected from contention based Random Access Preambles:
> 3> if the active DL BWP does not have the same bwp-Id as the active UL BWP:
> 4> switch the active DL BWP to the DL BWP with the same bwp-Id as the active UL BWP.
> 1> perform the Random Access procedure on the active DL BWP of SpCell and active UL BWP of this Serving Cell.

Alternate Embodiment 2

During the Random Access procedure on a Serving Cell, the MAC entity shall for this Serving Cell:

> 1> if PRACH occasions are not configured for the active UL BWP:
> 2> switch the active UL BWP to BWP indicated by initialUplinkBWP;
> 2> if the Random Access Preamble is selected from contention based Random Access Preambles:
> 3> switch the active DL BWP to BWP indicated by initialDownlinkBWP;
> 2> else (i.e. Random Access Preamble is selected from contention free Random Access Preambles):
> 3> if the active DL BWP does not have the same bwp-Id as the DL BWP active at the time this Random Access procedure was initiated:
> 4> switch the active DL BWP to BWP with the same bwp-Id as the DL BWP active at the time this Random Access procedure was initiated;
> 1> else:
> 2> if the Random Access Preamble is selected from contention based Random Access Preambles:
> 3> if the active DL BWP does not have the same bwp-Id as the active UL BWP:
> 4> switch the active DL BWP to the DL BWP with the same bwp-Id as the active UL BWP.
> 2> else:
> 3> if the active DL BWP does not have the same bwp-Id as the DL BWP active at the time this Random Access procedure was initiated:
> 4> switch the active DL BWP to BWP with the same bwp-Id as the DL BWP active at the time this Random Access procedure was initiated;
> 1> perform the Random Access procedure on the active DL BWP of SpCell and active UL BWP of this Serving Cell.

Alternate Embodiment 3

During the Random Access procedure on a Serving Cell, the MAC entity shall for this Serving Cell:

---

```
1>   if PRACH occasions are not configured for the active UL BWP:
    2>   switch the active UL BWP to BWP indicated by initialUplinkBWP;
    2>   if the Serving Cell is a SpCell:
        3>   if the Random Access Preamble is selected from contention based Random Access Preambles:
            4>      switch the active DL BWP to BWP indicated by initialDownlinkBWP;
        3>   else (i.e. Random Access Preamble is selected from contention free Random Access Preambles):
            4>   if the active DL BWP does not have the same bwp-Id as the DL BWP active at the time this Random Access procedure was initiated:
                5>   switch the active DL BWP to BWP with the same bwp-Id as the DL BWP active at the time this Random Access procedure was initiated;
1>   else:
    2>   if the Serving Cell is a SpCell:
        3>   if the Random Access Preamble is selected from contention based Random Access Preambles:
            4>      if the active DL BWP does not have the same bwp-Id as the active UL BWP:
                5>   switch the active DL BWP to the DL BWP with the same bwp-Id as the active UL BWP.
        3>   else:
            4>   if the active DL BWP does not have the same bwp-Id as the DL BWP active at the time this Random Access procedure was initiated:
                5>   switch the active DL BWP to BWP with the same bwp-Id as the DL BWP active at the time this Random Access procedure was initiated;
    1>      perform the Random Access procedure on the active DL BWP of SpCell and active UL BWP of this Serving Cell.
```

---

Alternate Embodiment 4

Upon initiation of the contention-based Random Access procedure on a Serving Cell, the MAC entity shall for this Serving Cell:

---

```
1>   if PRACH occasions are not configured for the active UL BWP:
    2>   switch the active UL BWP to BWP indicated by initialUplinkBWP;
    2>   switch the active DL BWP to BWP indicated by initialDownlinkBWP.
1>   else:
    2>   if the active DL BWP does not have the same bwp-Id as the active UL BWP:
        3>   switch the active DL BWP to the DL BWP with the same bwp-Id as the active UL BWP.
    1>   perform the Random Access procedure on the active DL BWP of SpCell and active UL BWP of this Serving Cell.
```

---

Figure 16:
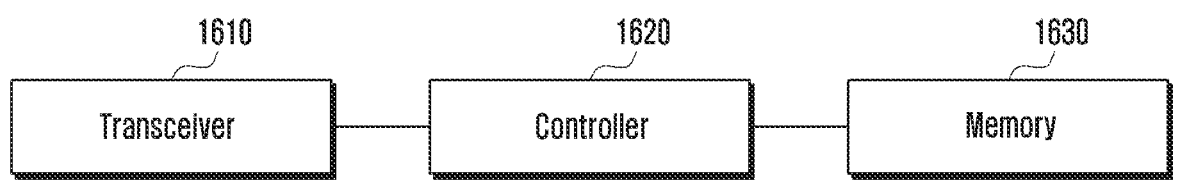
FIG. 16 is a block diagram of a terminal according to an embodiment of the disclosure.

FIG. 16 is a block diagram of a terminal according to an embodiment of the disclosure.

Referring to FIG. 16, a terminal includes a transceiver 1610, a controller 1620 and a memory 1630. The controller 1620 may refer to a circuitry, an ASIC, or at least one processor. The transceiver 1610, the controller 1620, and the memory 1630 are configured to perform the operations of the UE illustrated in the drawings, e.g., FIGS. 2, 6, 8, 10 and 12, or described above. Although the transceiver 1610, the controller 1620, and the memory 1630 are shown as separate entities, they may be realized as a single entity like a single chip. Alternatively, the transceiver 1610, the controller 1620, and the memory 1630 may be electrically connected to or coupled with each other.

The transceiver 1610 may transmit and receive signals to and from other network entities, e.g., a base station.

The controller 1620 may control the UE to perform functions according to one of the embodiments described above.

For example, the controller 1620 is configured to identify whether PRACH occasions are configured for the active UL BWP. If the PRACH occasions are not configured for the active UL BWP and the serving cell is a SpCell, the controller 1620 is configured to switch the active DL BWP to an initial DL BWP configuration indicated by initialDonlinkBWP in system information. In addition, the controller 1620 may be further configured to switch the active UL BWP to an initial UL BWP configuration for the serving cell indicated by initialUplinkBWP in system information if the PRACH occasions are not configured for the active UL BWP. In addition, the controller 1620 may be further configured to switch the active DL BWP to a DL BWP with the same bwp-Id as the active UL BWP if the PRACH occasions are configured for the active UL BWP and the serving cell is the SpCell and the active DL BWP does not have a same bwp-Id as the active UL BWP. The controller 1620 is configured to perform the RA procedure on the active DL BWP of the SpCell and the active UL BWP of the serving cell.

For example, the controller 1620 is configured to determine whether a MAC SDU is associated with a CCCH or DCCH. If the MAC SDU corresponds to a CCCH SDU, the controller 1620 is configured to identify the size of the MAC SDU to determine a LCID field of MAC subheader. The controller 1620 is configured to generate a MAC PDU including the MAC subheader and the MAC SDU, and to control the transceiver 1610 to transmit a Msg 3 associated with the generated MAC PDU to the gNB. The size of the MAC SDU may be either 48 or 64 bits. If the size of the MAC SDU is 48 bits, the controller is configured to set the LCID field to a first predetermined value. Otherwise, the controller is configured to set the LCID field to a second predetermined value different from the first predetermined value.

For example, the controller 1620 is configured to control the transceiver 1610 to receive information on resources for SI request (i.e., SI-Request-Resources) from the base station. The information on resources for SI request may include information on a start index of at least one RA preamble for SI request (i.e., ra-PreambleStartIndex). The controller 1620 is configured to control the transceiver to receive the information on resources for the SI request in SIB1. The controller 1620 may be configured to control the transceiver 1610 to receive information on a number of SSBs per a PRACH occasion in the SIB 1. The controller 1620 is configured to receive at least one SSB from the base station, and select an SSB among the at least one SSB. The controller 1620 may be configured to select an SSB above a threshold among the at least one SSB. The controller 1620 may be configured to select any SSB if none of the at least one SSB is above the threshold. The controller 1620 may be configured to determine a list of preambles for the SI request based on the information on the start index and the information on the number of SSBs per the PRACH occasion. The controller 1620 is configured to determine a preamble for the SI request corresponding to the selected SSB based on the information on the start index. The controller 1620 is configured to control the transceiver 1610 to transmit the determined preamble based on a PRACH occasion corresponding to the selected SSB.

In an embodiment, the operations of the terminal may be implemented using the memory 1630 storing corresponding program codes. Specifically, the terminal may be equipped with the memory 1630 to store program codes implementing desired operations. To perform the desired operations, the controller 1620 may read and execute the program codes stored in the memory 1630 by using a processor or a central processing unit (CPU).

Figure 17:
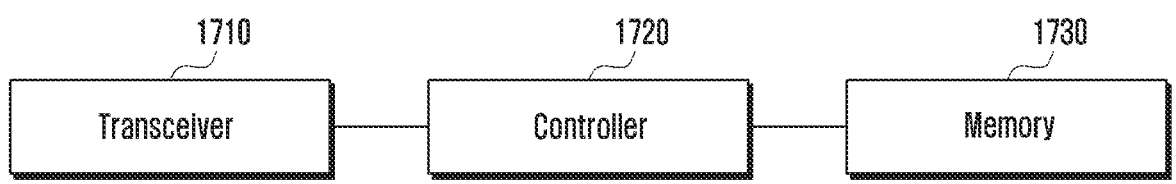
FIG. 17 is a block diagram of a base station according to an embodiment of the disclosure.

FIG. 17 is a block diagram of a base station according to an embodiment of the disclosure.

Referring to FIG. 17, a base station (BS) includes a transceiver 1710, a controller 1720 and a memory 1730. The controller 1720 may refer to a circuitry, an ASIC, or at least one processor. The transceiver 1710, the controller 1720 and the memory 1730 are configured to perform the operations of the network (e.g., gNB) illustrated in the drawings, e.g., FIGS. 2, 7, 9, 11 and 12, or described above. Although the transceiver 1710, the controller 1720, and the memory 1730 are shown as separate entities, they may be realized as a single entity like a single chip. Alternatively, the transceiver 1710, the controller 1720, and the memory 1730 may be electrically connected to or coupled with each other.

The transceiver 1710 may transmit and receive signals to and from other network entities, e.g., a terminal.

The controller 1720 may control the BS to perform functions according to one of the embodiments described above.

For example, the controller 1720 is configured to control the transceiver 1710 to receive a Msg3 associated with a MAC PDU from a terminal. If the received MAC SDU is a CCCH SDU, the controller is configured to identify the size of the MAC SDU based on a LCID field of the MAC subheader.

In an embodiment, the operations of the BS may be implemented using the memory 1730 storing corresponding program codes. Specifically, the BS may be equipped with the memory 1730 to store program codes implementing desired operations. To perform the desired operations, the controller 1720 may read and execute the program codes stored in the memory 1730 by using a processor or a CPU.

A communication method and system for converging a fifth generation (5G) communication system for supporting higher data rates beyond a fourth generation (4G) system with a technology for Internet of things (IoT) are provided. The communication method and system may be applied to intelligent services based on the 5G communication technology and the IoT-related technology, such as smart home, smart building, smart city, smart car, connected car, health care, digital education, smart retail, security and safety services. A method of a terminal for performing a random access procedure in a wireless communication system is provided. A method by a terminal for transmitting a message 3 (Msg3) in a random access procedure is provided.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a wireless communication system, the method comprising:
   receiving, from a base station, resource information for system information (SI) request, wherein the resource information includes information on a random access (RA)-preamble start index, the RA-preamble start index being a reference parameter for identifying at least one random access preamble for the SI request;
   receiving, from the base station, at least one synchronization signal block (SSB);
   selecting an SSB among the at least one SSB;
   selecting a random access preamble corresponding to the selected SSB from the at least one random access preamble identified based on the RA-preamble start index; and
   transmitting, to the base station, the selected random access preamble for the SI request based on a physical random access channel (PRACH) occasion corresponding to the selected SSB.

2. The method of claim 1, wherein the resource information for the SI request is included in a system information block 1 (SIB1) message received from the base station.

3. The method of claim 2, further comprising:
   identifying information on a number of SSBs per PRACH occasion included in the SIB1 message.

4. The method of claim 3, wherein, in case that the number of SSBs per PRACH occasion is larger than or equal to 1, a preamble index of the selected random access preamble for the SI request is equal to a sum of the RA-preamble start index and an index of the selected SSB.

5. The method of claim 3, wherein, in case that the number of SSBs per PRACH occasion is less than 1, a preamble index of the selected random access preamble for the SI request is equal to the RA-preamble start index.

6. The method of claim 1, wherein the selecting of the SSB among the at least one SSB comprises:
   selecting an SSB above a threshold among the at least one SSB; and
   selecting any SSB if none of the at least one SSB is above the threshold.

7. A terminal in a wireless communication system, the terminal comprising:
   a transceiver configured to transmit and receive a signal; and
   a controller coupled with the transceiver and configured to:
      receive, from a base station, resource information for system information (SI) request, wherein the resource information includes information on a random access (RA)-preamble start index, the RA-preamble start index being a reference parameter for identifying at least one random access preamble for the SI request, receive, from the base station, at least one synchronization signal block (SSB), select an SSB among the at least one SSB, select a random access preamble corresponding to the selected SSB from the at least one random access preamble identified based on the RA-preamble start index, and transmit, to the base station, the selected random access preamble for the SI request based on a physical random access channel (PRACH) occasion corresponding to the selected SSB.

8. The terminal of claim 7, wherein the resource information for the SI request is included in a system information block 1 (SIB1) message received from the base station.

9. The terminal of claim 8, wherein the controller is further configured to identify information on a number of SSBs per PRACH occasion included in the SIB1 message.

10. The terminal of claim 9, wherein, in case that the number of SSBs per PRACH occasion is larger than or equal to 1, a preamble index of the selected random access preamble for the SI request is equal to a sum of the RA-preamble start index and an index of the selected SSB.

11. The terminal of claim 9, wherein, in case that the number of SSBs per PRACH occasion is less than 1, a preamble index of the selected random access preamble for the SI request is equal to the RA-preamble start index.

12. The terminal of claim 7, wherein the controller is configured to select the SSB among the at least one SSB by:

selecting an SSB above a threshold among the at least one SSB, and selecting any SSB if none of the at least one SSB is above the threshold.

13. A method performed by a base station in a wireless communication system, the method comprising:

transmitting, to a terminal, resource information for system information request, wherein the resource information includes information on a random access (RA)-preamble start index, the RA-preamble start index being a reference parameter for identifying at least one random access preamble for the SI request;

transmitting, to the terminal, at least one synchronization signal block (SSB); and receiving, from the terminal, a random access preamble for the SI request corresponding to an SSB among the at least one SSB based on a physical random access channel (PRACH) occasion corresponding to the SSB, wherein the random access preamble corresponding to the SSB is selected from the at least one random access preamble identified based on the RA-preamble start index.

14. The method of claim 13, wherein the resource information for the SI request is included in a system information block 1 (SIB1) message transmitted to the terminal, wherein the SIB1 message further includes information on a number of SSBs per PRACH occasion, wherein, in case that the number of SSBs per PRACH occasion is larger than or equal to 1, a preamble index of the random access preamble for the SI request is equal to a sum of the RA-preamble start index and an index of the SSB, and wherein, in case that the number of SSBs per PRACH occasion is less than 1, the preamble index of the random access preamble for the SI request is equal to the RA-preamble start index.

15. A base station in a wireless communication system, the base station comprising:

a transceiver configured to transmit and receive a signal; and a controller coupled with the transceiver and configured to:

transmit, to a terminal, resource information for system information (SI) request, wherein the resource information includes information on a random access (RA)-preamble start index, the RA-preamble start index being a reference parameter for identifying at least one random access preamble for the SI request, transmit, to the terminal, at least one synchronization signal block (SSB), and receive, from the terminal, a random access preamble for the SI request corresponding to an SSB among the at least one SSB based on a physical random access channel (PRACH) occasion corresponding to the SSB, wherein the random access preamble corresponding to the SSB is selected from the at least one random access preamble identified based on the RA-preamble start index.

16. The base station of claim 15, wherein the resource information for the SI request is included in a system information block 1 (SIB1) message transmitted to the terminal, wherein the SIB1 message further includes information on a number of SSBs per PRACH occasion, wherein, in case that the number of SSBs per PRACH occasion is larger than or equal to 1, a preamble index of the random access preamble for the SI request is equal to a sum of the RA-preamble start index and an index of the SSB, and wherein, in case that the number of SSBs per PRACH occasion is less than 1, the preamble index of the random access preamble for the SI request is equal to the RA-preamble start index.

* * * * *